(12) United States Patent
Liang et al.

(10) Patent No.: US 11,216,004 B2
(45) Date of Patent: Jan. 4, 2022

(54) MAP AUTOMATION—LANE CLASSIFICATION

(71) Applicant: UATC, LLC, San Francisco, CA (US)

(72) Inventors: Justin Jin-Wei Liang, Toronto (CA); Raquel Urtasun Sotil, Toronto (CA)

(73) Assignee: UATC, LLC, San Francisco, CA (US)

( * ) Notice: Subject to any disclaimer, the term of this patent is extended or adjusted under 35 U.S.C. 154(b) by 528 days.

(21) Appl. No.: 16/183,012

(22) Filed: Nov. 7, 2018

(65) Prior Publication Data

US 2019/0138024 A1 May 9, 2019

Related U.S. Application Data

(60) Provisional application No. 62/582,764, filed on Nov. 7, 2017.

(51) Int. Cl.
| | |
|---|---|
| *G05D 1/02* | (2020.01) |
| *G06N 3/08* | (2006.01) |
| *G05D 1/00* | (2006.01) |
| *G06K 9/00* | (2006.01) |
| *G06N 3/04* | (2006.01) |
| *G06F 16/29* | (2019.01) |
| *G06F 16/51* | (2019.01) |
| *G06F 16/28* | (2019.01) |
| *G06K 9/46* | (2006.01) |

(Continued)

(52) U.S. Cl.
CPC .......... *G05D 1/0246* (2013.01); *G01C 21/32* (2013.01); *G05D 1/0088* (2013.01); *G05D 1/0274* (2013.01); *G06F 16/285* (2019.01); *G06F 16/29* (2019.01); *G06F 16/51* (2019.01); *G06K 9/00798* (2013.01); *G06K 9/4628* (2013.01); *G06K 9/6273* (2013.01); *G06N 3/04* (2013.01); *G06N 3/0454* (2013.01); *G06N 3/08* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2015/0204687 A1* | 7/2015 | Yoon | G01C 21/3647 701/436 |
| 2017/0025018 A1* | 1/2017 | Gignac | G08G 1/163 |
| 2017/0300763 A1* | 10/2017 | Zou | G06K 9/6271 |

(Continued)

FOREIGN PATENT DOCUMENTS

JP 2016168905 A * 9/2016

OTHER PUBLICATIONS

Adachi Jingo; Machine translation of JP-2016168905-A; Sep. 2016; espacenet.com (Year: 2016).*

(Continued)

*Primary Examiner* — David P. Merlino
(74) *Attorney, Agent, or Firm* — Schwegman Lundberg & Woessner, P.A.

(57) ABSTRACT

A computer system including one or more processors programmed or configured to receive image data associated with an image of one or more roads, where the one or more roads comprise one or more lanes, determine a lane classification of the one or more lanes based on the image data associated with the image of the one or more roads, and provide lane classification data associated with the lane classification of the one or more lanes.

20 Claims, 8 Drawing Sheets

(51) Int. Cl.
*G06K 9/62* (2006.01)
*G01C 21/32* (2006.01)

(56) References Cited

U.S. PATENT DOCUMENTS

| | | | |
|---|---|---|---|
| 2018/0129887 A1* | 5/2018 | Kang | G06K 9/00798 |
| 2019/0095722 A1* | 3/2019 | Kang | G06T 7/215 |
| 2019/0295420 A1* | 9/2019 | Fu | G01S 19/45 |
| 2020/0193176 A1* | 6/2020 | Tanaka | B60W 10/184 |
| 2020/0250440 A1* | 8/2020 | Campos | G06N 3/08 |

OTHER PUBLICATIONS

E. D. Dickmanns and B. D. Mysliwetz, "Recursive 3-D road and relative ego-state recognition," in IEEE Transactions on Pattern Analysis and Machine Intelligence, vol. 14, No. 2, pp. 199-213, Feb. 1992, doi: 10.1109/34.121789 (Year: 1992).*

S. Nedevschi et al., "Driving environment perception using stereovision," IEEE Proceedings. Intelligent Vehicles Symposium, 2005., 2005, pp. 331-336, doi: 10.1109/IVS.2005.1505124 (Year: 2005).*

* cited by examiner

MAP AUTOMATION—LANE CLASSIFICATION

CROSS REFERENCE TO RELATED APPLICATION

This application claims the benefit of U.S. Provisional Application No. 62/582,764, filed Nov. 7, 2017, the entire disclosure of which is hereby incorporated by reference in its entirety.

BACKGROUND

An autonomous vehicle (e.g., a driverless car, a driverless auto, a self-driving car, a robotic car, etc.) is a vehicle that is capable of sensing an environment of the vehicle and traveling (e.g., navigating, moving, etc.) in the environment without manual input from an individual. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an obstacle in a route, and to identify relevant traffic signs associated with a route.

SUMMARY

According to some non-limiting embodiments or aspects, provided is a method, comprising: receiving, with a computer system comprising one or more processors, image data associated with an image of one or more roads, wherein the one or more roads comprise one or more lanes; determining, with the computer system, a lane classification of the one or more lanes based on the image data associated with the image of the one or more roads; and providing, with the computer system, lane classification data associated with the lane classification of the one or more lanes.

In some non-limiting embodiments or aspects, the method further comprises processing, with the computer system, the artificial neuron data associated with one or more artificial neurons of the one or more convolution layers to produce pooling neuron data associated with one or more pooling neurons of a pooling layer; and generating the prediction score for the one or more elements of the feature map comprises: generating, with the computer system, the prediction score for the one or more elements of the feature map based on the artificial neuron data and the pooling neuron data.

In some non-limiting embodiments or aspects, the method further comprises providing the image data associated with the image of the one or more roads to a convolutional neural network. The method further comprises determining the lane classification of the one or more lanes that comprises processing the image data associated with the image of the one or more roads by the convolutional neural network. The method further comprises receiving the lane classification of the one or more lanes of the one or more roads from the convolutional neural network based on processing the image data associated with the image of the one or more roads.

In some non-limiting embodiments or aspects, the method further comprises determining the lane classification of the one or more lanes that comprises determining one or more lane markings associated with the one or more lanes of the one or more roads based on the image data associated with the image of the one or more roads and determining, with the computer system, a lane classification of the one or more lanes based on the one or more lane markings associated with the one or more lanes.

In some non-limiting embodiments or aspects, the method further comprises determining one or more lane attributes associated with the one or more lanes of the one or more roads based on one or more lane markings associated with the one or more lanes of the one or more roads. The method further comprises determining the lane classification of the one or more lanes that comprises determining the lane classification of the one or more lanes based on the one or more lane attributes associated with the one or more lanes of the one or more roads.

In some non-limiting embodiments or aspects, the lane classification of the one or more lanes comprises a lane classification associated with the one or more lane markings of the one or more lanes.

In some non-limiting embodiments or aspects, the image data associated with an image of a road includes a lane of the road with no markings, (e.g., includes no lines, no letters, and/or no symbols). For example, the image data associated with an image may be associated with a motion path (e.g., an inferred land, a virtual lane, a virtual lane stored in a map database that includes at least a portion of a lane or a segment of a lane, a trajectory, etc.). By way of example, the virtual lane may be at least partially associated with a road in the image data associated with a road map, but the road in the image data associated with the road map includes no physical markings. In some non-limiting embodiments or aspect, a virtual lane is associated to a road or a portion of a road stored virtually in a database (e.g., a map database), the virtual lane including virtual markings, (e.g., virtual lines, virtual letters, or virtual symbols) to indicate a lane attribute. In some non-limiting embodiments or aspects, the virtual lane includes a motion path having a trajectory for an autonomous vehicle to follow while traversing the lane. In some non-limiting embodiments or aspects, virtual lanes are classified by a virtual indicator, (e.g., attribute of "NO PAINT", attribute of "SOLID WHITE").

In some non-limiting embodiments or aspects, the method further comprises generating a warped road segment associated with the one or more roads from the image data associated with the image of the one or more roads. The method further comprises providing warped road segment image data associated with the warped road segment as an input to a machine learning algorithm. The method further comprises receiving the lane classification of the one or more lanes based on the warped road segment image data associated with the warped road segment.

According to some non-limiting embodiments or aspects, provided is a computing system comprising: one or more processors programmed or configured to: receive image data associated with an image of one or more roads, wherein the one or more roads comprise one or more lanes; determine a lane classification of the one or more lanes based on the image data associated with the image of the one or more roads; and provide lane classification data associated with the lane classification of the one or more lanes.

In some non-limiting embodiments or aspects, the one or more processors are further programmed or configured to provide the image data associated with the image of the one or more roads to a convolutional neural network. The one or more processors, when determining a lane classification of the one or more lanes, are further programmed or configured to process the image data associated with the image of the one or more roads by the convolutional neural network. The one or more processors are further programmed or configured to receive the lane classification of the one or more lanes of the one or more roads from the convolutional neural network based on processing the image data associated with the image of the one or more roads.

In some non-limiting embodiments or aspects, the one or more processors are further programmed or configured to determine the one or more lane markings associated with the one or more lanes of the one or more roads based on the image data associated with the image of the one or more roads and to determine a lane classification of the one or more lanes based on the one or more lane markings associated with the one or more lanes.

In some non-limiting embodiments or aspects, wherein the one or more processors are further programmed or configured to determine one or more lane attributes associated with the one or more lanes of the one or more roads based on the one or more lane markings associated with the one or more lanes of the one or more roads; and wherein the one or more processors, when determining the lane classification of the one or more lanes, are programmed or configured to: determine the lane classification of the one or more lanes based on the one or more lane attributes associated with the one or more lanes of the one or more roads.

In some non-limiting embodiments or aspects, the lane classification of the one or more lanes comprises a lane classification associated with the one or more lane markings of the one or more lanes.

In some non-limiting embodiments or aspects, the one or more processors are further programmed or configured to generate a warped road segment associated with the one or more roads from the image data associated with the image of the one or more roads. The one or more processors are further programmed to provide warped road segment image data associated with the warped road segment as an input to a machine learning algorithm. The one or more processors are further programmed to receive the lane classification of the one or more lanes based on the warped road segment image data associated with the warped road segment.

According to some non-limiting embodiments or aspects, provided is an autonomous vehicle comprising: one or more sensors for detecting an object in an environment surrounding the autonomous vehicle; and a vehicle computing system comprising one or more processors, wherein the vehicle computing system is programmed or configured to: receive autonomous vehicle (AV) map data associated with an AV map including one or more roads, the AV map including one or more prediction scores associated with one or more areas of the AV map, wherein the AV map data is determined based on: receiving image data associated with an image of one or more roads, wherein the one or more roads comprise one or more lanes; determining a lane classification of the one or more lanes based on the image data associated with the image of the one or more roads; and providing lane classification data associated with the lane classification of the one or more lanes; and control travel of the autonomous vehicle based on sensor data from the one or more sensors and the AV map data associated with the AV map.

According to some non-limiting embodiments or aspects, the vehicle computing system is further programmed or configured to determine that the one or more areas of the AV map comprise a lane classification associated with the one or more lane markings of the one or more lanes and control the autonomous vehicle to travel with respect to the lane classification based on determining that the one or more areas of the AV map comprise a lane classification associated with the one or more lane markings of the one or more lanes.

According to some non-limiting embodiments or aspects, provided is a computer program product including at least one non-transitory computer-readable medium including one or more instructions that, when executed by at least one processor, cause the at least one processor to receive image data associated with an image of one or more roads, where the one or more roads comprise one or more lanes; determine a lane classification of the one or more lanes based on the image data associated with the image of the one or more roads; and provide lane classification data associated with the lane classification of the one or more lanes.

In some non-limiting embodiments or aspects, wherein the one or more instructions cause the at least one processor to provide the image data associated with the image of the one or more roads to a convolutional neural network; wherein the one or more instructions cause the at least one processor, when determining a lane classification of the one or more lanes, to: process the image data associated with the image of the one or more roads by the convolutional neural network; and receive the lane classification of the one or more lanes of the one or more roads from the convolutional neural network based on processing the image data associated with the image of the one or more roads.

Further non-limiting embodiments or aspects are set forth in the following numbered clauses:

Clause 1: A method comprising: receiving, with a computer system comprising one or more processors, image data associated with an image of one or more roads, wherein the one or more roads comprise one or more lanes; determining, with the computer system, a lane classification of the one or more lanes based on the image data associated with the image of the one or more roads; and providing, with the computer system, lane classification data associated with the lane classification of the one or more lanes.

Clause 2: The method of clause 1, further comprising: providing the image data associated with the image of the one or more roads to a convolutional neural network; wherein determining the lane classification of the one or more lanes comprises: processing the image data associated with the image of the one or more roads by the convolutional neural network; and the method further comprising: receiving the lane classification of the one or more lanes of the one or more roads from the convolutional neural network based on processing the image data associated with the image of the one or more roads.

Clause 3: The method of clauses 1 and 2, wherein determining the lane classification of the one or more lanes comprises: determining one or more lane markings associated with the one or more lanes of the one or more roads based on the image data associated with the image of the one or more roads; and determining a lane classification of the one or more lanes based on the one or more lane markings associated with the one or more lanes.

Clause 4: The method of any of clauses 1-3, further comprising determining one or more lane attributes associated with the one or more lanes of the one or more roads based on the one or more lane markings associated with the one or more lanes of the one or more roads; and wherein determining the lane classification of the one or more lanes comprises: determining the lane classification of the one or more lanes based on the one or more lane attributes associated with the one or more lanes of the one or more roads.

Clause 5: The method of any of clauses 1-4, wherein the lane classification of the one or more lanes comprises a lane classification associated with a lane marking of the one or more lanes.

Clause 6: The method of any of clauses 1-5, wherein the one or more lane markings comprise at least one of: one or more lines, one or more letters, one or more symbols, or any combination thereof.

Clause 7: The method of any of clauses 1-6, further comprising: generating a warped road segment associated with the one or more roads based on the image data associated with the image of the one or more roads; providing warped road segment image data associated with the warped road segment as an input to a machine learning algorithm; and receiving the lane classification of the one or more lanes based on the warped road segment image data associated with the warped road segment.

Clause 8: A computing system comprising: one or more processors programmed or configured to: receive image data associated with an image of one or more roads, wherein the one or more roads comprise one or more lanes; determine a lane classification of the one or more lanes based on the image data associated with the image of the one or more roads; and provide lane classification data associated with the lane classification of the one or more lanes.

Clause 9: The computing system of clause 8, wherein the one or more processors are further programmed or configured to: provide the image data associated with the image of the one or more roads to a convolutional neural network; wherein the one or more processors, when determining a lane classification of the one or more lanes are further programmed or configured to: process the image data associated with the image of the one or more roads by the convolutional neural network; and the one or more processors are further programmed or configured to: receive the lane classification of the one or more lanes of the one or more roads from the convolutional neural network based on processing the image data associated with the image of the one or more roads.

Clause 10: The computing system of clauses 8 and 9, wherein the one or more processors are further programmed or configured to: determine one or more lane markings associated with the one or more lanes of the one or more roads based on the image data associated with the image of the one or more roads; and determine a lane classification of the one or more lanes based on the one or more lane markings associated with the one or more lanes.

Clause 11: The computing system of clauses 8-10, wherein the one or more processors are further programmed or configured to: determine one or more lane attributes associated with the one or more lanes of the one or more roads based on the one or more lane markings associated with the one or more lanes of the one or more roads; and wherein the one or more processors, when determining the lane classification of the one or more lanes, are programmed or configured to: determine the lane classification of the one or more lanes based on the one or more lane attributes associated with the one or more lanes of the one or more roads.

Clause 12: The computing system of any of clauses 8-11, wherein the lane classification of the one or more lanes comprises a lane classification associated with a lane marking of the one or more lanes.

Clause 13: The computing system of any of clauses 8-12, wherein the one or more lane markings comprise at least one of: one or more lines, one or more letters, one or more symbols, or any combination thereof.

Clause 14: The computing system of any of clauses 8-13, wherein the one or more processors are further programmed or configured to: generate a warped road segment associated with the one or more roads from the image data associated with the image of the one or more roads; provide warped road segment image data associated with the warped road segment as an input to a machine learning algorithm; and receive the lane classification of the one or more lanes based on the warped road segment image data associated with the warped road segment.

Clause 15: An autonomous vehicle comprising: one or more sensors for detecting an object in an environment surrounding the autonomous vehicle; and a vehicle computing system comprising one or more processors, wherein the vehicle computing system is programmed or configured to: receive autonomous vehicle (AV) map data associated with an AV map including one or more roads, the AV map including one or more prediction scores associated with one or more areas of the AV map, wherein the AV map data is determined based on: receiving image data associated with an image of one or more roads, wherein the one or more roads comprise one or more lanes; determining a lane classification of the one or more lanes based on the image data associated with the image of the one or more roads; and providing lane classification data associated with the lane classification of the one or more lanes; and control travel of the autonomous vehicle based on sensor data from the one or more sensors and the AV map data associated with the AV map.

Clause 16: The autonomous vehicle of clause 15, wherein the vehicle computing system is further programmed or configured to: determine that the one or more areas of the AV map comprise a lane classification associated with one or more lane markings of the one or more lanes; and control the autonomous vehicle to travel with respect to the lane classification based on determining that the one or more areas of the AV map comprise a lane classification associated with a lane marking of the one or more lanes.

Clause 17: The autonomous vehicle of clauses 15 and 16, wherein the lane classification of the one or more lanes comprises a lane classification associated with a lane marking of the one or more lanes.

Clause 18: The autonomous vehicle of any of clauses 15-17, wherein the one or more lane markings comprise at least one of: one or more lines, one or more letters, one or more symbols, or any combination thereof.

Clause 19: The autonomous vehicle of any of clauses 15-18, wherein the AV map data is determined based on: providing the image data associated with the image of the one or more roads to a convolutional neural network; processing the image data associated with the image of the one or more roads by the convolutional neural network; and receiving the lane classification of the one or more lanes of the one or more roads from the convolutional neural network based on processing the image data associated with the image of the one or more roads.

Clause 20: The autonomous vehicle of any of clauses 15-19, wherein the AV map data is determined based on: determining one or more lane markings associated with the one or more lanes of the one or more roads based on the image data associated with the image of the one or more roads; and determining the lane classification of the one or more lanes based on the one or more lane markings associated with the one or more lanes.

Clause 21: A computer program product comprising at least one non-transitory computer-readable medium including one or more instructions that, when executed by at least one processor, cause the at least one processor to: receive image data associated with an image of one or more roads, wherein the one or more roads comprise one or more lanes; determine a lane classification of the one or more lanes based on the image data associated with the image of the one or more roads; and provide lane classification data associated with the lane classification of the one or more lanes.

Clause 22: The computer program product of clause 21, wherein the one or more instructions cause the at least one processor to: provide the image data associated with the image of the one or more roads to a convolutional neural network; wherein the one or more instructions cause the at least one processor, when determining a lane classification of the one or more lanes, to: process the image data associated with the image of the one or more roads by the convolutional neural network; and receive the lane classification of the one or more lanes of the one or more roads from the convolutional neural network based on processing the image data associated with the image of the one or more roads.

DETAILED DESCRIPTION

Figure 1:
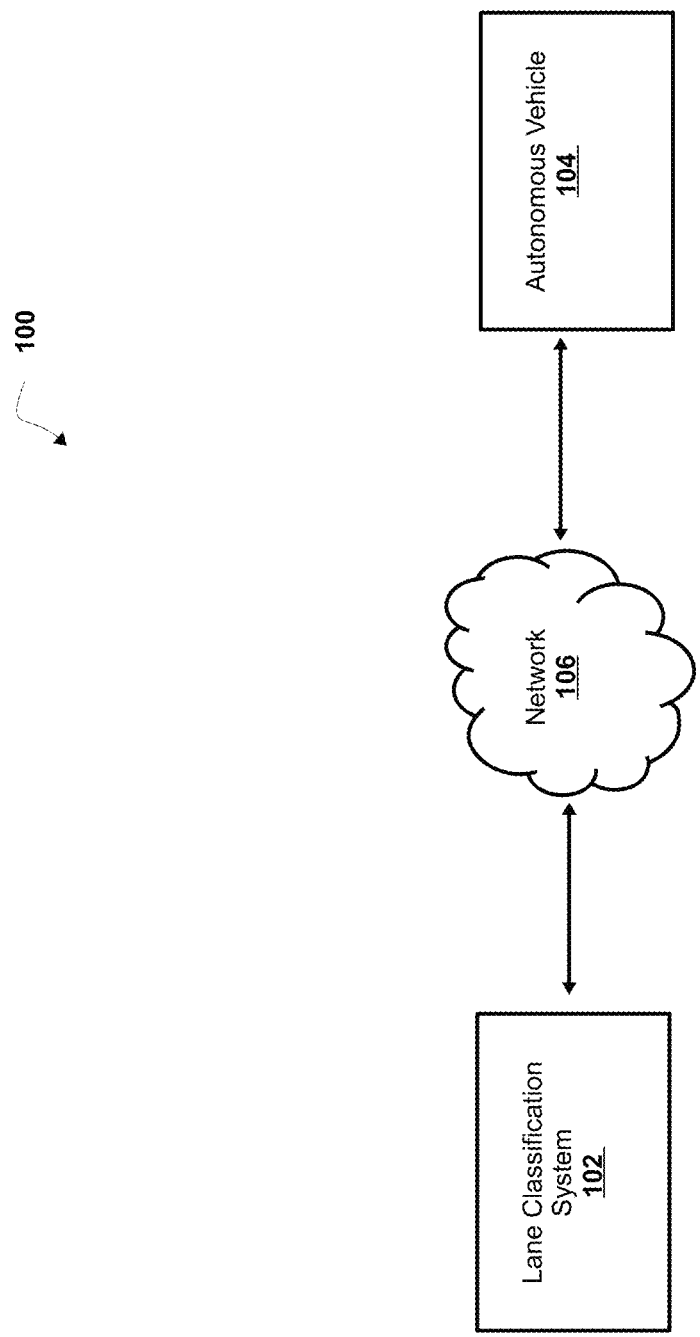
FIG. 1 is a schematic diagram of a non-limiting embodiment or aspect of an environment in which systems and/or methods, described herein, can be implemented.

The following detailed description of non-limiting embodiments or aspects refers to the accompanying drawings. The same reference numbers in different drawings identify the same or similar elements.

In some non-limiting embodiments or aspects, an autonomous vehicle is operated based on an autonomous vehicle (AV) map (e.g., one or more electronic files based on which an autonomous vehicle may operate) that includes data regarding features of a road upon which the autonomous vehicle travels. For example, the autonomous vehicle is operated based on an AV map that includes a manual designation (e.g., a designation made by an individual based on a determination from the individual) regarding a direction that the autonomous vehicle is to travel when the autonomous vehicle travels on the road. In some non-limiting embodiments or aspects, the autonomous vehicle is required to travel on a lane of the road based on a lane classification of the lane. For example, the autonomous vehicle is required to change from a lane of the road on which the autonomous vehicle is traveling to another lane of the road based on a traffic condition on the road. In some non-limiting embodiments or aspects, the autonomous vehicle uses an AV map of the road to travel on a lane of the road based on a lane classification of the lane that includes a manual designation of the lane classification.

However, a map that includes a manual designation of a lane classification of a lane may be inaccurate. In addition, an autonomous vehicle may not be able to travel on a lane of a road that includes a manual designation of a lane classification of the lane. For example, an autonomous vehicle may not be able to determine (e.g., read) a lane classification of a lane in an AV map based on an inaccuracy in the AV map that includes a manual designation of the lane classification. Furthermore, generating an AV map that includes manual designations of lane classifications of a road may consume a large amount of network and/or processing resources and a large amount of time. Additionally, an AV map may not be able to be generated that includes all lane classifications of lanes of a road if an individual provides manual designations for the lane classifications based on a lack of network and/or processing resources to generate the map, a lack of time to generate the map, and/or a lack of data associated with a lane of a road to generate the AV map.

As disclosed herein, in some non-limiting embodiments or aspects, a lane classification system receives image data associated with an image of one or more roads, where the one or more roads include one or more lanes. In some non-limiting embodiments or aspects, the lane classification system determines a lane classification of the one or more lanes of the one or more roads based on the image data associated with the image of the one or more roads. For example, the lane classification system determines one or more lane markings (e.g., one or more road markings, one or more road surface markings, one or more pavement markings, one or more traffic markings, etc.) of the one or more lanes based on the image data (e.g., image data associated with the one or more lane markings, lane marking image data, etc.) associated with the image of the one or more roads and determines a lane classification of the one or more lanes based on the one or more lane markings of the one or more lanes. In some non-limiting embodiments or aspects, the image data includes lane marking image data associated with the one or more lane markings of one or more lanes of the one or more roads. In some non-limiting embodiments or aspects, the lane classification system provides (e.g., outputs, transmits, communicates, etc.) lane classification data associated with the lane classification of the one or more lanes. For example, the lane classification system provides the lane classification data associated with the lane classification of the one or more lanes to an autonomous vehicle based on determining the lane classification of the one or more lanes. In some non-limiting embodiments or aspects, the lane classification system may generate a map (e.g., an AV map) based on the lane classification data associated with the lane classification of the one or more lanes.

In this way, the lane classification system may generate an AV map that more accurately identifies a lane classification of a lane as compared to an AV map that includes a manual designation of a lane classification. In addition, the lane classification system may allow an autonomous vehicle to be able to travel on a lane of a road using a map (e.g., a road map, an AV map, etc.) generated based on the lane classification data associated with the lane classification of the lane. Additionally, the lane classification system may generate a map based on the lane classification data associated with the lane classification of a lane using fewer network and/or processing resources and in less time than it takes to generate a map that includes a manual designation of the lane classification of a lane.

Referring now to FIG. 1, FIG. 1 is a diagram of a non-limiting embodiment or aspect of an environment 100 in which systems and/or methods, described herein, can be implemented. As shown in FIG. 1, environment 100 includes lane classification system 102, autonomous vehicle 104, and network 106. Systems and/or devices of environment 100 may interconnect via wired connections, wireless connections, or a combination of wired and wireless connections.

In some non-limiting embodiments or aspects, lane classification system 102 includes one or more devices capable of receiving image data associated with an image (e.g., image data associated with an image of a road, image data associated with an image of a lane of a road, image data associated with an image of a road map, image data associated with a feature map that includes features of a road, etc.), storing the image data, processing the image data, and/or providing the image data and/or data associated with a lane classification of a lane. For example, lane classification system 102 includes one or more computing systems comprising one or more processors (e.g., one or more processors of one or more servers, one or more routers, etc.). In some non-limiting embodiments or aspects, lane classification system 102 is capable of processing the image data to determine a lane classification of a lane of a road based on image data associated with an image of the road. In some non-limiting embodiments or aspects, lane classification system 102 is capable of providing map data associated with a map (e.g., road map data associated with a road map, AV map data associated with an AV map) to autonomous vehicle 104.

In some non-limiting embodiments or aspects, autonomous vehicle 104 includes one or more devices capable of receiving, storing, processing, and/or providing map data associated with a map (e.g., road map data associated with a road map, AV map data associated with an AV map, etc.). For example, autonomous vehicle 104 includes one or more computing systems comprising one or more processors (e.g., one or more servers, etc.). In some non-limiting embodiments or aspects, autonomous vehicle 104 receives AV map data associated with an AV map and autonomous vehicle 104 travels to a location on the AV map based on the map data. In some non-limiting embodiments or aspects, autonomous vehicle 104 includes lane classification system 102. In some non-limiting embodiments or aspects, autonomous vehicle 104 is separate from lane classification system 102. Further details regarding non-limiting embodiments or aspects of autonomous vehicle 104 are provided below with regard to FIG. 2.

In some non-limiting embodiments or aspects, network 106 includes one or more wired and/or wireless networks. For example, network 106 include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems, devices, and networks shown in FIG. 1 are provided as an example. There can be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally, or alternatively, a set of systems or a set of devices (e.g., one or more systems, one or more devices) of environment 100 can perform one or more functions described as being performed by another set of systems or another set of devices of environment 100.

Figure 2:
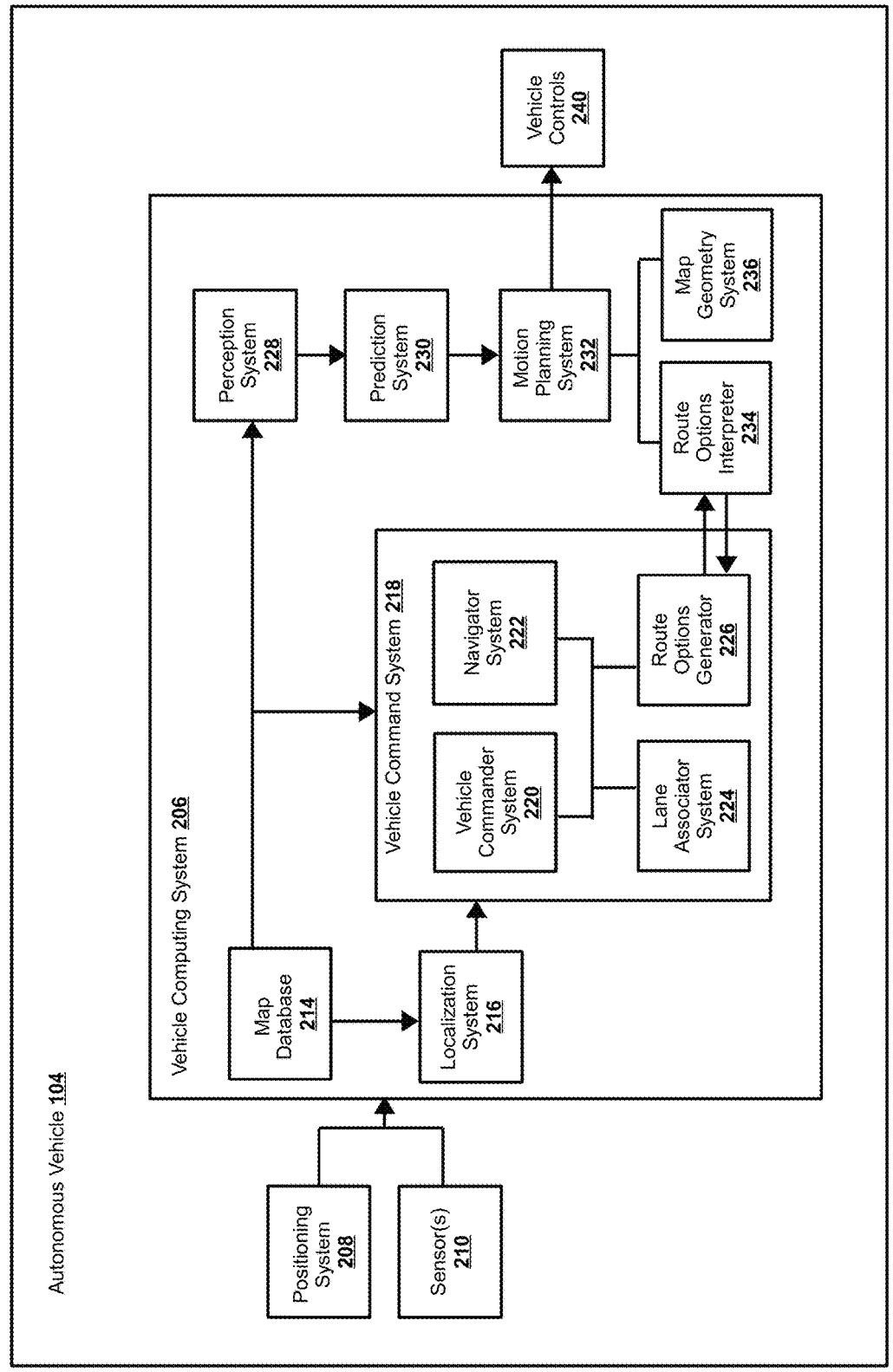
FIG. 2 is a schematic diagram of a non-limiting embodiment or aspect of a system for controlling the autonomous vehicle shown in FIG. 1.

Referring now to FIG. 2, FIG. 2 is a diagram of a non-limiting embodiment or aspect of a system 200 for controlling autonomous vehicle 104. As shown in FIG. 2, vehicle computing system 206 includes vehicle command system 218, perception system 228, prediction system 230, motion planning system 232, local route interpreter 234, and map geometry system 236 that cooperate to perceive a surrounding environment of autonomous vehicle 104, determine a motion plan of autonomous vehicle 104 based on the perceived surrounding environment, and control the motion (e.g., the direction of travel) of autonomous vehicle 104 based on the motion plan.

In some non-limiting embodiments or aspects, vehicle computing system 206 is connected to or includes positioning system 208. In some non-limiting embodiments or aspects, positioning system 208 determines a position (e.g., a current position, a past position, etc.) of autonomous vehicle 104. In some non-limiting embodiments or aspects, positioning system 208 determines a position of autonomous vehicle 104 based on an inertial sensor, a satellite positioning system, an IP address (e.g., an IP address of autonomous vehicle 104, an IP address of a device in autonomous vehicle 104, etc.), triangulation based on network components (e.g., network access points, cellular towers, Wi-Fi access points, etc.), and/or proximity to network components, and/or the like. In some non-limiting embodiments or aspects, the position of autonomous vehicle 104 is used by vehicle computing system 206.

In some non-limiting embodiments or aspects, vehicle computing system 206 receives sensor data from one or more sensors 210 that are coupled to or otherwise included in autonomous vehicle 104. For example, one or more sensors 210 include a Light Detection and Ranging (LIDAR) system, a Radio Detection and Ranging (RADAR) system, one or more cameras (e.g., visible spectrum cameras, infrared cameras, etc.), and/or the like. In some non-limiting embodiments or aspects, the sensor data includes data that describes a location of objects within the surrounding environment of autonomous vehicle 104. In some non-limiting embodiments or aspects, one or more sensors 210 collect sensor data that includes data that describes a location (e.g., in three-dimensional space relative to autonomous vehicle 104) of points that correspond to objects within the surrounding environment of autonomous vehicle 104.

In some non-limiting embodiments or aspects, the sensor data includes a location (e.g., a location in three-dimensional space relative to the LIDAR system) of a number of points (e.g., a point cloud) that correspond to objects that have reflected a ranging laser. In some non-limiting embodiments or aspects, the LIDAR system measures distances by measuring a Time of Flight (TOF) that a short laser pulse takes to travel from a sensor of the LIDAR system to an object and back, and the LIDAR system calculates the distance of the object to the LIDAR system based on the known speed of light. In some non-limiting embodiments or aspects, map data includes LIDAR point cloud maps associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

In some non-limiting embodiments or aspects, the sensor data includes a location (e.g., a location in three-dimensional space relative to the RADAR system) of a number of points that correspond to objects that have reflected a ranging radio wave. In some non-limiting embodiments or aspects, radio waves (e.g., pulsed radio waves or continuous radio waves) transmitted by the RADAR system can reflect off an object and return to a receiver of the RADAR system. The RADAR system can then determine information about the object's location and/or speed. In some non-limiting embodiments or aspects, the RADAR system provides information about the location and/or the speed of an object relative to the RADAR system based on the radio waves.

In some non-limiting embodiments or aspects, image processing techniques (e.g., range imaging techniques, as an example, structure from motion, structured light, stereo triangulation, etc.) can be performed by system 200 to identify a location (e.g., in three-dimensional space relative to the one or more cameras) of a number of points that correspond to objects that are depicted in images captured by one or more cameras. Other sensors can identify the location of points that correspond to objects as well.

In some non-limiting embodiments or aspects, map database 214 provides detailed information associated with the map, features of the roadway in the geographic location, and information about the surrounding environment of autonomous vehicle 104 for autonomous vehicle 104 to use while driving (e.g., traversing a route, planning a route, determining a motion plan, controlling autonomous vehicle 104, etc.).

In some non-limiting embodiments or aspects, vehicle computing system 206 receives a vehicle pose from localization system 216 based on one or more sensors 210 that are coupled to or otherwise included in autonomous vehicle 104. In some non-limiting embodiments or aspects, localization system 216 includes a LIDAR localizer, a low quality pose localizer, and/or a pose filter. For example, the localization system 216 uses a pose filter that receives and/or determines one or more valid pose estimates (e.g., not based on invalid position data, etc.) from the LIDAR localizer and/or the low quality pose localizer for determining a map-relative vehicle pose. For example, a low quality pose localizer determines a low quality pose estimate in response to receiving position data from positioning system 208 for operating (e.g., routing, navigating, controlling, etc.) autonomous vehicle 104 under manual control (e.g., in a coverage lane, on a coverage motion path, etc.). In some non-limiting embodiments or aspects, LIDAR localizer determines a LIDAR pose estimate in response to receiving sensor data (e.g., LIDAR data, RADAR data, etc.) from sensors 210 for operating (e.g., routing, navigating, controlling, etc.) autonomous vehicle 104 under autonomous control (e.g., in an AV lane, on an AV motion path, etc.).

In some non-limiting embodiments or aspects, vehicle command system 218 includes vehicle commander system 220, navigator system 222, path and/or lane associator system 224, and local route generator 226 that cooperate to route and/or navigate autonomous vehicle 104 in a geographic location. In some non-limiting embodiments or aspects, vehicle commander system 220 provides tracking of a current objective of autonomous vehicle 104, such as a current service, a target pose, a coverage plan (e.g., development testing, etc.), and/or the like. In some non-limiting embodiments or aspects, navigator system 222 determines and/or provides a route plan (e.g., a route between a starting location or a current location and a destination location, etc.) for autonomous vehicle 104 based on a current state of autonomous vehicle 104, map data (e.g., lane graph, motion path, driving path, etc.), and one or more vehicle commands (e.g., a target pose). For example, navigator system 222 determines a route plan (e.g., a plan, a re-plan, a deviation from a route plan, etc.) including one or more lanes (e.g., current lane, future lane, etc.) and/or one or more motion paths (e.g., a current motion path, a future motion path, a driving path, etc.) in one or more roadways that autonomous vehicle 104 can traverse on a route to a destination location (e.g., a target location, a trip drop-off location, etc.).

In some non-limiting embodiments or aspects, navigator system 222 determines a route plan based on one or more lanes and/or one or more motion paths received from path and/or lane associator system 224. In some non-limiting embodiments or aspects, path and/or lane associator system 224 determines one or more lanes and/or one or more motion paths (e.g., driving paths, etc.) of a route in response to receiving a vehicle pose from localization system 216. For example, path and/or lane associator system 224 determines, based on the vehicle pose, that autonomous vehicle 104 is on a coverage lane and/or a coverage motion path, and in response to determining that autonomous vehicle 104 is on the coverage lane and/or the coverage motion path, determines one or more candidate lanes (e.g., routable lanes, etc.) and/or one or more candidate motion paths (e.g., routable motion paths, etc.) within a distance of the vehicle pose associated with autonomous vehicle 104. For example, path and/or lane associator system 224 determines, based on the vehicle pose, that autonomous vehicle 104 is on an AV lane and/or an AV motion path, and in response to determining that autonomous vehicle 104 is on the AV lane and/or the AV motion path, determines one or more candidate lanes (e.g., routable lanes, etc.) and/or one or more candidate motion paths (e.g., routable motion paths, etc.) within a distance of the vehicle pose associated with autonomous vehicle 104. In some non-limiting embodiments or aspects, navigator system 222 generates a cost function for each of the one or more candidate lanes and/or the one or more candidate motion paths that autonomous vehicle 104 may traverse on a route to a destination location. For example, navigator system 222 generates a cost function that describes a cost (e.g., a cost over a time period) of following (e.g., adhering to) one or more lanes and/or one or more motion paths that may be used to reach the destination location (e.g., a target pose, etc.).

In some non-limiting embodiments or aspects, local route generator 226 generates and/or provides route options that may be processed and control travel of autonomous vehicle 104 on a local route. For example, navigator system 222 may configure a route plan, and local route generator 226 may generate and/or provide one or more local routes or route options for the route plan. For example, the route options may include one or more options for adapting the motion of the AV to one or more local routes in the route plan (e.g., one or more shorter routes within a global route between the current location of the AV and one or more exit locations located between the current location of the AV and the destination location of the AV, etc.). In some non-limiting embodiments or aspects, local route generator 226 may determine a number of route options based on a predetermined number, a current location of the AV, a current service of the AV, and/or the like.

In some non-limiting embodiments or aspects, perception system 228 detects and/or tracks objects (e.g., vehicles, pedestrians, bicycles, and the like) that are proximate to (e.g., in proximity to the surrounding environment of) autonomous vehicle 104 over a time period. In some non-limiting embodiments or aspects, perception system 228 can retrieve (e.g., obtain) map data from map database 214 that provides detailed information about the surrounding environment of autonomous vehicle 104.

In some non-limiting embodiments or aspects, perception system 228 determines one or more objects that are proximate to autonomous vehicle 104 based on sensor data received from one or more sensors 210 and/or map data from map database 214. For example, perception system 228 determines, for the one or more objects that are proximate, state data associated with a state of such an object. In some non-limiting embodiments or aspects, the state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape, such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

In some non-limiting embodiments or aspects, perception system 228 determines state data for an object over a number of iterations of determining state data. For example, perception system 228 updates the state data for each object of a plurality of objects during each iteration.

In some non-limiting embodiments or aspects, prediction system 230 receives the state data associated with one or more objects from perception system 228. Prediction system 230 predicts one or more future locations for the one or more objects based on the state data. For example, prediction system 230 predicts the future location of each object of a plurality of objects within a time period (e.g., 5 seconds, 10 seconds, 20 seconds, etc.). In some non-limiting embodiments or aspects, prediction system 230 predicts that an object will adhere to the object's direction of travel according to the speed of the object. In some non-limiting embodiments or aspects, prediction system 230 uses machine learning techniques or modeling techniques to make a prediction based on state data associated with an object.

In some non-limiting embodiments or aspects, motion planning system 232 determines a motion plan for autonomous vehicle 104 based on a prediction of a location associated with an object provided by prediction system 230 and/or based on state data associated with the object provided by perception system 228. For example, motion planning system 232 determines a motion plan (e.g., an optimized motion plan) for autonomous vehicle 104 that causes autonomous vehicle 104 to travel relative to the object based on the prediction of the location for the object provided by prediction system 230 and/or the state data associated with the object provided by perception system 228.

In some non-limiting embodiments or aspects, motion planning system 232 receives a route plan as a command from navigator system 222. In some non-limiting embodiments or aspects, motion planning system 232 determines a cost function for one or more motion plans of a route for autonomous vehicle 104 based on the locations and/or predicted locations of one or more objects. For example, motion planning system 232 determines the cost function that describes a cost (e.g., a cost over a time period) of following (e.g., adhering to) a motion plan (e.g., a selected motion plan, an optimized motion plan, etc.). In some non-limiting embodiments or aspects, the cost associated with the cost function increases and/or decreases based on autonomous vehicle 104 deviating from a motion plan (e.g., a selected motion plan, an optimized motion plan, a preferred motion plan, etc.). For example, the cost associated with the cost function increases and/or decreases based on autonomous vehicle 104 deviating from the motion plan to avoid a collision with an object.

In some non-limiting embodiments or aspects, motion planning system 232 determines a cost of following a motion plan. For example, motion planning system 232 determines a motion plan for autonomous vehicle 104 based on one or more cost functions. In some non-limiting embodiments or aspects, motion planning system 232 determines a motion plan (e.g., a selected motion plan, an optimized motion plan, a preferred motion plan, etc.) that minimizes a cost function. In some non-limiting embodiments or aspects, motion planning system 232 provides a motion plan to vehicle controls 240 (e.g., a device that controls acceleration, a device that controls steering, a device that controls braking, an actuator that controls gas flow, etc.) to implement the motion plan.

In some non-limiting embodiments or aspects, motion planning system 232 communicates with local route interpreter 234 and map geometry system 236. In some non-limiting embodiments or aspects, local route interpreter 234 may receive and/or process route options from local route generator 226. For example, local route interpreter 234 may determine a new or updated route for travel of autonomous vehicle 104. As an example, one or more lanes and/or one or more motion paths in a local route may be determined by local route interpreter 234 and map geometry system 236. For example, local route interpreter 234 can determine a route option and map geometry system 236 determines one or more lanes and/or one or more motion paths in the route option for controlling motion of autonomous vehicle 104.

Figure 3:
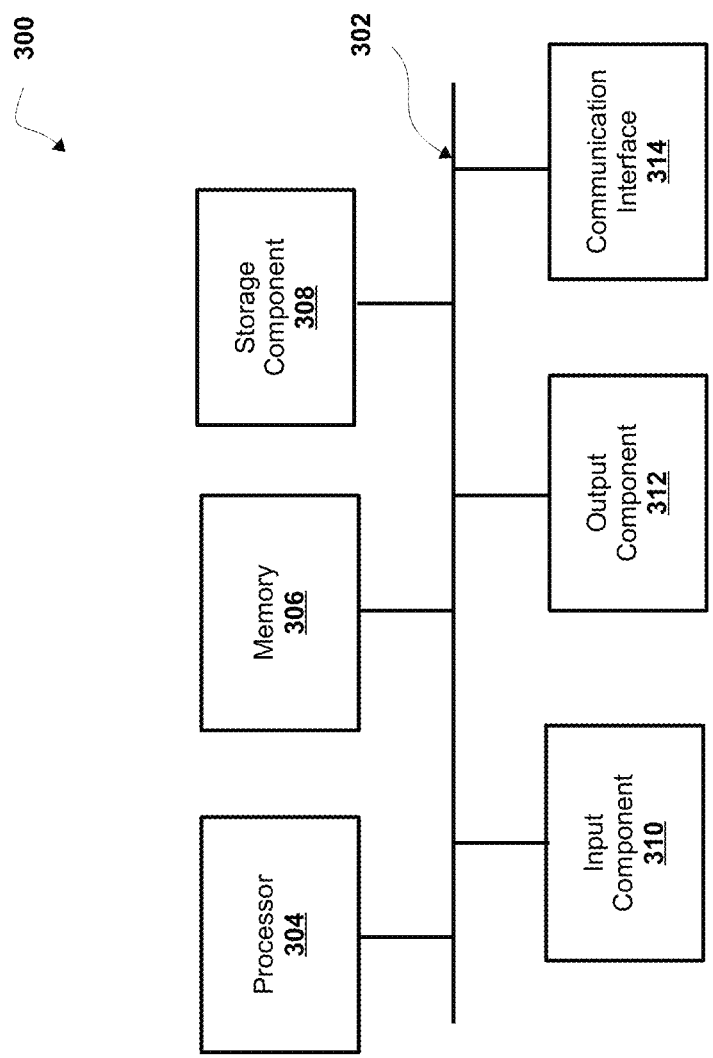
FIG. 3 is a schematic diagram of a non-limiting embodiment or aspect of components of one or more devices of FIGS. 1 and 2.

Referring now to FIG. 3, FIG. 3 is a diagram of example components of a device 300. Device 300 corresponds to one or more devices of lane classification system 102 and/or one or more devices (e.g., one or more devices of a system of) autonomous vehicle 104. In some non-limiting embodiments or aspects, one or more devices of lane classification system 102 and/or one or more devices (e.g., one or more devices of a system of) autonomous vehicle 104 include at least one device 300 and/or at least one component of device 300. As shown in FIG. 3, device 300 includes bus 302, processor 304, memory 306, storage component 308, input component 310, output component 312, and communication interface 314.

Bus 302 includes a component that permits communication among the components of device 300. In some non-limiting embodiments or aspects, processor 304 is implemented in hardware, firmware, or a combination of hardware and software. For example, processor 304 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 includes a random access memory (RAM), a read-only memory (ROM), and/or another type of dynamic or static storage device (e.g., flash memory, magnetic memory, optical memory, etc.) that stores information and/or instructions for use by processor 304.

Storage component 308 stores information and/or software related to the operation and use of device 300. For example, storage component 308 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 includes a component that permits device 300 to receive information, such as via user input (e.g., a touch screen display, a keyboard, a keypad, a mouse, a button, a switch, a microphone, etc.). Additionally, or alternatively, input component 310 includes a sensor for sensing information (e.g., a global positioning system (GPS) component, an accelerometer, a gyroscope, an actuator, etc.). Output component 312 includes a component that provides output information from device 300 (e.g., a display, a speaker, one or more light-emitting diodes (LEDs), etc.).

Communication interface 314 includes a transceiver-like component (e.g., a transceiver, a separate receiver and transmitter, etc.) that enables device 300 to communicate with other devices, such as via a wired connection, a wireless connection, or a combination of wired and wireless connections. Communication interface 314 permits device 300 to receive information from another device and/or provide information to another device. For example, communication interface 314 includes an Ethernet interface, an optical interface, a coaxial interface, an infrared interface, a radio frequency (RF) interface, a universal serial bus (USB) interface, a Wi-Fi interface, a cellular network interface, and/or the like.

In some non-limiting embodiments or aspects, device 300 performs one or more processes described herein. In some non-limiting embodiments or aspects, device 300 performs these processes based on processor 304 executing software instructions stored by a computer-readable medium, such as memory 306 and/or storage component 308. A computer-readable medium (e.g., a non-transitory computer-readable medium) is defined herein as a non-transitory memory device. A memory device includes memory space located inside of a single physical storage device or memory space spread across multiple physical storage devices.

Software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments or aspects described herein are not limited to any specific combination of hardware circuitry and software.

The number and arrangement of components shown in FIG. 3 are provided as an example. In some non-limiting embodiments or aspects, device 300 includes additional components, fewer components, different components, or differently arranged components than those shown in FIG. 3. Additionally, or alternatively, a set of components (e.g., one or more components) of device 300 performs one or more functions described as being performed by another set of components of device 300.

Figure 4:
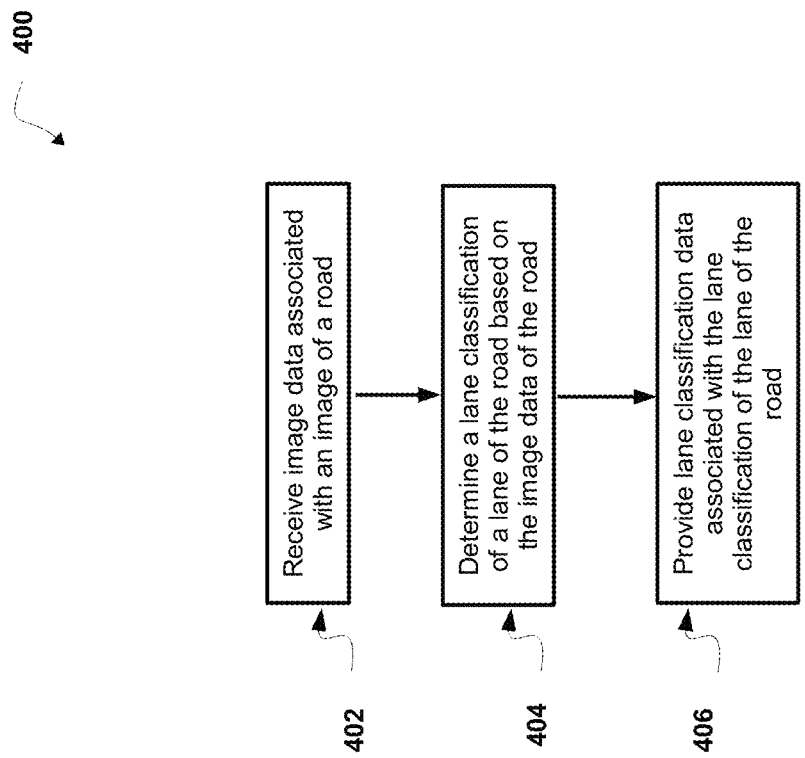
FIG. 4 is a flowchart of a non-limiting embodiment or aspect of a process for automatically classifying a lane of a road based on image data.

Referring now to FIG. 4, FIG. 4 is a flowchart of a non-limiting embodiment or aspect of a process 400 for automatically classifying a lane of a road based on image data. In some non-limiting embodiments or aspects, one or more of the steps of process 400 can be performed (e.g., completely, partially, etc.) by lane classification system 102 (e.g., one or more devices of lane classification system 102). In some non-limiting embodiments or aspects, one or more of the steps of process 400 can be performed (e.g., completely, partially, etc.) by another device or a group of devices separate from or including lane classification system 102, such as autonomous vehicle 104 (e.g., one or more devices of autonomous vehicle 104).

As shown in FIG. 4, at step 402, process 400 includes receiving image data associated with an image of a road. For example, lane classification system 102 receives image data associated with an image of a road (e.g., an image of a road in a geographic location; an image of a geographic location that includes a roads, such as a geographic location image; an image of one or more roads that includes data associated with operating a vehicle on the one or more roads, such as a road map; an image of a road that includes features of the road, such as a feature map; an image of a lane of a road located in a map; etc.). In some non-limiting embodiments or aspects, lane classification system 102 receives image data associated with an image and/or an image from an image database (e.g., a database that stores an image). For example, lane classification system 102 receives the image data associated with the image and/or the image from an image database based on lane classification system 102 receiving a request for a map and/or map data associated with a map (e.g., a request for an updated AV map and/or updated AV map data associated with an updated AV map) from autonomous vehicle 104.

In some non-limiting embodiments or aspects, image data associated with an image of a road includes Light Detection and Ranging (LIDAR) image data associated with a LIDAR image of the road and/or Red Green Blue (RGB) image data (e.g., truecolor image data) associated with an RGB image of the road. In some non-limiting embodiments or aspects, the RGB image data is associated with a top down image of the road. In some non-limiting embodiments or aspects, the image data includes black and white image data associated with a black and white image of the road.

In some non-limiting embodiments or aspects, the image data is associated with an image of a road and the road includes a lane of the road. For example, the image data includes image data associated with an image of a geographic location (e.g., geographic location image data associated with an image of a geographic location) including one or more roads, image data associated with a road map (e.g., road map image data associated with an image of a road map) including one or more roads, lane marking image data associated with an image of a lane marking of a lane of a road, and/or image data associated with a feature map (e.g., feature map data associated with a feature map) of features of a road. In some non-limiting embodiments or aspects, a lane marking includes a device and/or material on a road surface of a road to convey official information associated with operating a vehicle in a lane of the road.

In some non-limiting embodiments or aspects, a lane marking is associated with an indication of a lane attribute. For example, the lane marking is associated with an indication of a travel lane (e.g., an indication that a lane is a travel lane, an indication of a direction of travel in a travel lane, an indication of a traffic control in a travel lane, such as a stop location in a travel lane, a speed limit in a travel lane, and/or the like, an indication of a traffic warning in a travel lane, such as a hazardous location in a travel lane, an indication of an identifier of a road, such as an indication of a name of a road, etc.), an indication of a high occupancy vehicle (HOV) lane, an indication of a bicycle lane, an indication of a public transportation lane (e.g., a bus lane), an indication of a parking lane, an indication of a turning lane (e.g., an indication of a direction of travel while turning from a turning lane), an indication of a one-directional travel lane (e.g., a one-way road), an indication of a multi-directional travel lane (e.g., a bidirectional lane, etc.), an indication of a reversible travel lane (e.g., a lane in which traffic may travel in a first direction during a first time period and a second direction, opposite the first direction, during a second time period), an indication of an emergency lane (e.g., an emergency vehicle only lane, etc.), an indication of a deceleration lane, an indication of a railway crossing, an indication of an intersection of a plurality of roads (e.g., an intersection of two roads, an intersection of three roads, an intersection of four roads, etc.), an indication of a commercial pickup zone (e.g., a hotel pickup zone, a bus loading zone, etc.), an indication of a parking area (e.g., a parking location, a parking spot, a parking location for a disabled individual, etc.), an indication of a ramp for a road (e.g., an exit ramp for a road, an entrance ramp for a road, etc.), an indication of an emergency escape for a road (e.g., an emergency escape ramp, an escape lane, a runaway truck ramp, a runaway truck lane, a truck arrester bed, etc.), an indication of a lane associated with a toll road (e.g., a toll plaza lane, restricted toll plaza lanes, etc.), an indication of a traffic calming device (e.g., a speed hump, a speed bump, etc.), an indication of a construction area on a road (e.g., a work zone on a road, etc.), an indication of an area of a road that has travel restrictions (e.g., an indication that a lane of a road that is closed to vehicle traffic, etc.), an indication of a crosswalk, an indication of a merge area of a road, an indication that a lane of a road is ending, and/or the like.

In some non-limiting embodiments or aspects, a lane marking is associated with an indication of a merge area of a road. For example, a lane marking is associated an indication of two or more upstream lanes that are connected to a single downstream lane. In some non-limiting embodiments or aspects, a lane marking in the merging area is associated with additional caution (e.g. an additional indication that vehicles from the two lanes may need to co-ordinate with each other, etc.).

In some non-limiting embodiments or aspects, a lane marking is associated with an indication of a fork in a road (e.g., a fork in a highway, etc.). For example, a lane marking is associated with an indication of a junction (e.g., a branch, an intersection, etc.) in which one road (e.g., a highway) becomes two divergent roads. In some non-limiting embodiments or aspects, a lane marking is associated with an indication of a point where a route includes one or more road possibilities to be traversed (e.g., a selection, etc.). For example, a lane marking is associated with an indication of a junction between at least three roads (e.g., a three-way intersection having a junction between three roads (e.g., road segments, etc.), a T junction when two roads form one road, a Y junction if approached from the stem of the Y, a four way intersection, a five way intersection, a six way intersection, etc.).

Additionally or alternatively, lane marking image data and/or a lane marking is associated with an indication that a lane of a road can be traveled by an autonomous vehicle. For example, the lane marking image data and/or lane marking includes an indication that a lane of a road can be traveled by an autonomous vehicle in an autonomous mode or a non-autonomous mode.

In some non-limiting embodiments or aspects, a lane marking includes one or more lines, one or more letters (e.g., one or more letters that include "BUS LANE", one or more letters that includes "HOV LANE", one or more letters that include "TOLL PLAZA", etc.), and/or one or more symbols (e.g., one or more arrows, one or more diamonds, one or more symbols for a bicycle, one or more symbols associated with a bike lane, etc.) on a road indicating a lane attribute of the lane. For example, the lane marking includes one or more lines, one or more letters, and/or one or more symbols on the road indicating that the lane includes a passing zone, that the lane includes a no-passing zone, that the lane is a HOV lane, that the lane is a lane associated with a toll plaza, and/or the like. In some non-limiting embodiments or aspects, the one or more lines on the road includes a broken line on a road (e.g., a broken line on a road indicating a passing zone, etc.), a solid line on a road (e.g., a solid line on a road indicating a no-passing zone, etc.), a plurality of broken lines on a road (e.g., a plurality of broken lines adjacent each other on a road), a plurality of solid lines on a road (e.g., a plurality of solid lines adjacent each other on a road), a broken line on a road adjacent a solid line on a road, and/or the like.

Additionally or alternatively, the one or more lines on the road include one or more lines on an edge of a road (e.g., along an edge of a road, parallel to and adjacent an edge of a road, etc.) and/or one or more lines in a road (e.g., one or more lines in a portion of road on which a vehicle is intended to travel and is not restricted by a physical barrier or by separation so that the vehicle is able to travel laterally, one or more lines in a road indicating a separation between two lanes, one or more lines in a middle of a road indicating a separation between two lanes, etc.). For example, the one or more lines include a solid line on an edge of a road, a solid line in a road, a broken line on an edge of a road, a broken line in a road, a solid line and a broken line on an edge of a road (e.g., a solid line and a broken line adjacent an edge of a road, etc.), a solid line and a broken line in a road (e.g., a solid line adjacent a broken line adjacent in a road, etc.), and/or the like.

Additionally or alternatively, the one or more lines, the one or more letters, and/or the one or more symbols on the road include one or more lines that include a color that indicates a lane attribute of a lane. For example, the one or more lines (e.g., one or more broken lines, one or more solid lines, etc.) include one or more yellow lines, one or more white lines, one or more orange lines, one or more blue lines, and/or the like.

In some non-limiting embodiments or aspects, the image data associated with an image of a road includes a warped road segment associated the road. In some non-limiting embodiments or aspects, lane classification system 102 generates a warped road segment associated with a road. For example, lane classification system 102 receives image data associated with an image of a road that includes a lane and the road and/or the lane has an orientation that is not straight (e.g., the road and/or the lane is curved). Lane classification system 102 determines a line that is normal (e.g., perpendicular) to the road and/or the lane at one or more points along a curve of the road and/or the lane. In some non-limiting embodiments or aspects, the line includes a first dimension (e.g., a first dimension including a number of pixels in length) and a second dimension (e.g., a second dimension including a number of pixels in width). Lane classification system 102 scans (e.g., extracts) image data associated with the line (e.g., line image data associated with the line) from the image of the road. Lane classification system 102 arranges the image data associated with the line for each point of the one or more points along the curve of the road and/or the lane in a straight orientation to generate the warped road segment.

In some non-limiting embodiments or aspects, lane classification system 102 receives image data associated with an image of a road and the image data includes lane identification data associated with a lane of the road. For example, lane classification system 102 receives image data that includes an indication that a segment of the road includes and/or is identified as a lane of the road. In some non-limiting embodiments or aspects, lane classification system 102 determines lane identification data associated with a lane of a road based on image data associated with an image of the road. For example, lane classification system 102 determines a lane of a road in a geographic location based on a uniform color in a portion of a top down camera image of the geographic location that includes the lane. In some non-limiting embodiments or aspects, lane classification system 102 determines lane identification data associated with a lane of a road based on the feature map data associated with a feature map that includes the road.

In some non-limiting embodiments or aspects, lane classification system 102 receives image data associated with an image of a road including a lane of the road with no markings, (e.g., includes no lines, no letters, and/or no symbols). For example, lane classification system 102 receives image data associated with an image based on a motion path (e.g., an inferred land, a virtual lane, a virtual lane stored in a map database that includes at least a portion of a lane or a segment of a lane, a trajectory, etc.). By way of example, lane classification system 102 receives image data associated a motion path at least partially associated with a road in the image data (e.g., image data associated with a road map, etc.), but the road in the image data associated with the road map includes no physical markings. In some non-limiting embodiments or aspects, lane classification system 102 receives image data including a motion path associated with a road (e.g., a portion of a road, etc.) stored virtually in a database (e.g., a map database), the virtual lane including virtual markings, (e.g., virtual lines, virtual letters, or virtual symbols) to indicate a lane attribute. In some non-limiting embodiments or aspects, lane classification system 102 receives image data including a motion path (e.g., driving path, etc.) having a virtual trajectory for an autonomous vehicle to follow while traversing the lane. In some non-limiting embodiments or aspects, motion paths may be classified by a virtual indicator, (e.g., attribute of "NO PAINT", attribute of "SOLID WHITE").

In some non-limiting embodiments or aspects, lane classification system 102 receives image data associated with an image of one or more features of a road. For example, lane classification system 102 receives the image data that includes data associated with the one or more features of the road. In some non-limiting embodiments or aspects, data associated with one or more features of a road includes data associated with a road edge of a road (e.g., a location of a road edge of a road, a distance of location from a road edge of a road, an indication whether a location is within a road edge of a road, etc.), data associated with an intersection of a road with another road, data associated with a lane of a road (e.g., data associated with a travel lane of a road, data associated with a parking lane of a road, data associated with a turning lane of a road, data associated with a lane marking of a lane, data associated with a direction of travel in a lane of a road, etc.), data associated with one or more objects (e.g., a vehicle, vegetation, an individual, a structure, a building, a sign, a lamppost, signage, etc.) in proximity to and/or within a road (e.g., objects in proximity to the road edges of a road and/or within the road edges of a road), data associated with a sidewalk of a road, and/or the like.

In some non-limiting embodiments or aspects, lane classification system 102 determines feature map data associated with a feature map that includes one or more features of a road. For example, lane classification system 102 receives data associated with one or more features of a road (e.g., a road located in the feature map) from one or more sensors located on an autonomous vehicle (e.g., autonomous vehicle 104). Lane classification system 102 determines the feature map data based on the data associated with the one or more features of the road. In some non-limiting embodiments or aspects, lane classification system 102 receives data (e.g., data collected by one or more sensors) associated with one or more features of a road from the autonomous vehicle as the autonomous vehicle travels on a road. In some non-limiting embodiments or aspects, lane classification system 102 determines the feature map data based on a manual input from an individual. For example, lane classification system 102 determines the feature map data based on one or more features of a road that are labeled by an individual.

In some non-limiting embodiments or aspects, lane classification system 102 receives geographic location image data associated with an image of a geographic location (e.g., a geographic location image). In some non-limiting embodiments or aspects, a geographic location image includes an image of a geographic location that includes one or more roads. In some non-limiting embodiments or aspects, the geographic location image data (e.g., data associated with a photograph, data associated with a picture, data associated with an aerial photograph, etc.) and/or the image of the geographic location is received from an online source (e.g., maps from Uber, Bing maps, Google Maps, Mapquest, etc.). In some non-limiting embodiments or aspects, the geographic location includes a country, a state, a city, a portion of a city, a township, a portion of a township, and/or the like. In some non-limiting embodiments or aspects, the image of the geographic location includes one or more roads (e.g., one road, a portion of the roads, all of the roads, etc.) in the geographic location.

In some non-limiting embodiments or aspects, the image data is associated with an image that has a first dimension (e.g., a first dimension including a number of pixels in length) and a second dimension (e.g., a second dimension including a number of pixels in width). In some non-limiting embodiments or aspects, an image includes a matrix (e.g., a grid, a rectangular array, a multi-dimensional grid, a multi-dimensional array, a set of rows and columns, etc.) that has a plurality of elements (e.g., units, cells, pixels, etc.). Each element of the matrix includes image data (e.g., a value of image data, a value of geographic location image data, a value of road map data, a value of lane marking image data, a value of feature map data, etc.) associated with the image. In some non-limiting embodiments or aspects, the size of an element of the matrix corresponds to the size of the subject matter of the image based on a scale (e.g., the ratio of the size of an element of the matrix of the image to the corresponding size in the real world) of the image. For example, the size of one element corresponds to a shape with a predetermined dimension (e.g., a 0.1 m by 0.1 m square, a 1 m by 1 m square, a triangle with sides having a length of 0.1 m, etc.) in the real world.

In some non-limiting embodiments or aspects, each element of an image is associated with three dimensions. For example, a first dimension of the element is a width of the element, a second dimension of the element is a length of the element, and a third dimension is a value associated with the image data of the element. In some non-limiting embodiments or aspects, at least one element in one image of a plurality of images corresponds geospatially to at least one element in at least one other image of the plurality of images. For example, a location (e.g., a coordinate) of a first element of a first image in a first matrix is the same as a location (e.g., a coordinate) of a second element of a second image in a second matrix. In another example, a location (e.g., a coordinate) of a first element of a first image in a first matrix is offset from a location (e.g., a coordinate) of a second element of a second image in a second matrix. In some non-limiting embodiments or aspects, a size and/or a location of one or more elements of a matrix of an image and a size and/or a location of one or more elements of a matrix of another image correspond to a same size and/or a same location of the subject matter of the image in the real world. For example, a first location of one or more elements in a matrix of a first image represent a subject matter in the real world and a second location of one or more elements in a matrix of a second image represent the same subject matter in the real world. In some non-limiting embodiments or aspects, a size and/or a location of one or more elements of a matrix of an image and a size and/or a location of one or more elements of a matrix of another image correspond to a different size and/or a different location of the subject matter of the image in the real world. For example, a first location of one or more elements in a matrix of a first image represent a subject matter in the real world and a second location of one or more elements in a matrix of a second image represent different subject matter in the real world.

In some non-limiting embodiments or aspects, a road refers to a paved or otherwise improved path between two places that allows for travel by a vehicle (e.g., an autonomous vehicle). In some non-limiting embodiments or aspects, a road includes a public road, a street, a parkway, a byway, a highway, an interstate, and/or the like. Additionally or alternatively, a road includes a lane and a sidewalk in proximity to (e.g., adjacent, near, next to, touching, etc.) the lane. In some non-limiting embodiments or aspects, a lane includes a portion of road on which a vehicle is intended to travel and is not restricted by a physical barrier or by separation so that the vehicle is able to travel laterally. Additionally or alternatively, a road includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane from which a vehicle turns), and/or the like. In some non-limiting embodiments or aspects, the image data associated with the image is based on data collected by and/or received from one or more sensors located on a vehicle (e.g., a non-autonomous vehicle, an autonomous vehicle, autonomous vehicle 104) as the autonomous vehicle 104 travels on one or more roads in a geographic location. In some non-limiting embodiments or aspects, the image data includes data received in real-time from the one or more sensors located on the vehicle.

In some non-limiting embodiments or aspects, lane classification system 102 generates a map (e.g., a road map of one or more roads to be traveled on by a vehicle; a map of a geographic location; an AV map, a portion of an AV map, such as an AV submap; etc.). For example, lane classification system 102 generates the map based on geographic location image data associated with a geographic location image and/or feature map data associated with a feature map. In some non-limiting embodiments or aspects, a road map includes an image of one or more roads and is associated with operating a vehicle on the one or more roads. In some non-limiting embodiments or aspects, road map data associated with a road map includes data associated with operating a vehicle on the one or more roads of the road map. In some non-limiting embodiments or aspects, the map (e.g., a road map, a non-autonomous vehicle map, an AV map, a feature map, etc.) is generated based on data received from one or more sensors located on autonomous vehicle 104.

As further shown in FIG. 4, at step 404, process 400 includes determining a lane classification of a lane of the road based on the image data associated with the image of the road. For example, lane classification system 102 determines the lane classification of the lane of the road based on the image data associated with the image of the road. In some non-limiting embodiments or aspects, a lane classification includes a classification of a lane of a road associated with one or more restrictions based on which a vehicle (e.g., a non-autonomous vehicle, an autonomous vehicle, autonomous vehicle 104, etc.) may travel in the lane. In some non-limiting embodiments or aspects, the lane classification includes a color associated with the lane classification of a lane. For example, the lane classification includes a yellow color marking (e.g., a yellow line) associated with a separation between two lanes that have a direction of travel that is opposite each other, a first edge of a road of a divided road (e.g., a divided highway), a first edge of a road with one directional lane, a first edge of a ramp for a road, a first edge of an emergency escape of a road, a first edge of a reversible lane, and/or the like. In another example, the lane classification includes a white color marking (e.g., a white line) associated with a separation between two lanes that have a direction of travel that is the same for each other, a second edge of a road, and/or the like. In another example, the lane classification includes a blue color marking (e.g., a blue line) associated with a parking area and/or the like. In another example, the lane classification includes a purple color marking (e.g., a purple line) associated with a lane of a toll road and/or the like. In another example, the lane classification includes a red color marking (e.g., a red line) associated with a one directional travel lane, a ramp for a road, an emergency escape for a road, an area of a road that has travel restrictions, and/or the like.

In some non-limiting embodiments or aspects, the lane classification includes a style associated with the lane classification of a lane. For example, the lane classification includes a broken line on a road (e.g., "DASHED") separates lanes of traffic moving in the same direction and/or may be associated with a passing zone providing an indication it is an area where passing other cars is permitted. In another example, the lane classification includes a broken line on a road (e.g., "DOTTED") associated with passing zone providing an indication it is an area where passing other cars is permitted. In another example, the lane classification includes a solid line on a road (e.g., a "SINGLE SOLID") indicating that changing lanes is discouraged, although not specifically prohibited and/or a left edge of a highway. In another example, the lane classification includes a plurality of broken lines on a road (e.g., "DOUBLE DASHED") associated with a center of a two-way road indicating crossing allowed in either direction if it is safe. the lane classification includes a plurality of solid lines on a road (e.g., "DOUBLE SOLID") associated with a center of a two-way road indicating crossing not allowed in either direction, a broken line on a road adjacent a solid line on a road, and/or the like. In another example, the lane classification includes a no lanes (e.g., "NO LANE") indicating that a lane is not present in this area of the road.

In some non-limiting embodiments or aspects, the lane classification includes a type associated with the lane classification of a lane including one or more letters. For example, a lane marking includes a bus lane (e.g., "BUS LANE"), an HOV lane (e.g., "HOV LANE"), a toll lane (e.g., "TOLL PLAZA"), a bike lane (e.g., "BIKE LANE"), a non-auto lane (e.g., "NONAUTO LANE"), a route lane (e.g., "ROUTABLE LANE"), a normal lane (e.g., "NORMAL LANE") indicating a car lane, and/or the like.

In some non-limiting embodiments or aspects, lane classification system 102 determines the lane classification of the lane based on a machine learning technique (e.g., a pattern recognition technique, a data mining technique, a heuristic technique, a supervised learning technique, an unsupervised learning technique, etc.). For example, lane classification system 102 generates a model (e.g., an estimator, a classifier, a lane classification model, a prediction model, a lane classification prediction model, etc.) based on a machine learning algorithm (e.g., a decision tree algorithm, a gradient boosted decision tree algorithm, a neural network algorithm, a convolutional neural network algorithm, etc.). In such an example, lane classification system 102 generates the lane classification of the lane of the road using the model. In some non-limiting embodiments or aspects, lane classification system 102 determines a lane classification associated with an element of a matrix of an image (e.g., an image of a map) that includes a lane of a road. For example, lane classification system 102 determines a lane classification associated with the element of the matrix of the image using a model.

In some non-limiting embodiments or aspects, lane classification system 102 generates a prediction score of a lane classification of the lane of the road. For example, lane classification system 102 generates the prediction score of the lane classification of the lane of the road based on a machine learning technique (e.g., a pattern recognition technique, a data mining technique, a heuristic technique, a supervised learning technique, an unsupervised learning technique, etc.). In some non-limiting embodiments or aspects, a prediction score of a lane classification includes an indication (e.g., a score, a number, a ranking, etc.) of the likelihood that an element of the matrix of the image includes a lane classification of a lane of a road. In some non-limiting embodiments or aspects, lane classification system 102 generates one or more prediction scores of a lane classification associated with one or more elements (e.g., each element of a plurality of elements, a portion of elements of the plurality of elements, etc.) of a matrix of an image. For example, lane classification system 102 generates a prediction score of a lane classification for each element of a plurality of elements of the matrix of the image.

In some non-limiting embodiments or aspects, lane classification system 102 generates a model (e.g., a lane classification model, a lane classification prediction model, etc.) based on image data associated with an image of a road. In some implementations, the model is designed to receive, as an input, image data associated with one or more images of a road that includes a lane, and provide, as an output, an indication (e.g., a marking, a prediction, a probability, a binary output, a yes-no output, a score, a prediction, a prediction score, a lane classification prediction score, etc.) of a lane classification of the lane of the road. In one example, the model is designed to receive image data associated with an image of a road, and provide an output that indicates a lane classification of a lane of the road in which a vehicle (e.g., autonomous vehicle 104) may travel. In some non-limiting embodiments or aspects, lane classification system 102 stores the model (e.g., stores the model for later use). In some non-limiting embodiments or aspects, lane classification system 102 stores the model in a data structure (e.g., a database, a linked list, a tree, etc.). In some non-limiting embodiments or aspects, the data structure is located within lane classification system 102 or external (e.g., remote from) lane classification system 102.

In some non-limiting embodiments or aspects, lane classification system 102 processes the image data to obtain training data for the model. For example, lane classification system 102 processes the image data to change the image data into a format that is analyzed (e.g., by lane classification system 102) to generate the model. The image data that is changed is referred to as training data. In some implementations, lane classification system 102 processes the image data to obtain the training data based on receiving the image data. Additionally, or alternatively, lane classification system 102 processes the image data to obtain the training data based on lane classification system 102 receiving an indication that lane classification system 102 is to process the image data from a user of lane classification system 102, such as when lane classification system 102 receives an indication to create a model for a portion of an image (e.g., an image of a geographic location, an image of a road in a geographic location, etc.), a portion of a road map, a portion of an AV map, a portion of a feature map, and/or the like.

In some non-limiting embodiments or aspects, lane classification system 102 processes the image data by determining an image variable based on the image data. In some non-limiting embodiments or aspects, an image variable includes a metric, associated with a lane classification of a lane, which is derived based on the image data. The image variable is analyzed to generate a model. For example, the image variable includes a variable regarding image data associated with an image of a geographic location, road map data associated with a road map, lane marking data associated with a lane marking image data, and/or feature map data associated with a feature map. In some non-limiting embodiments or aspects, the image variable is a variable associated with a lane of a road. For example, the image variable is a variable associated with a lane marking of a lane.

In some non-limiting embodiments or aspects, lane classification system 102 analyzes the training data to generate a model (e.g., a lane classification model, a lane classification prediction model, etc.). For example, lane classification system 102 uses machine learning techniques to analyze the training data to generate the model. In some implementations, generating the model (e.g., based on training data obtained from image data, based on training data obtained from historical image data) is referred to as training the model. The machine learning techniques include, for example, supervised and/or unsupervised techniques, such as decision trees (e.g., gradient boosted decision trees), logistic regressions, artificial neural networks (e.g., convolutional neural networks), Bayesian statistics, learning automata, Hidden Markov Modeling, linear classifiers, quadratic classifiers, association rule learning, and/or the like. In some non-limiting embodiments or aspects, the model includes a lane classification prediction model that is specific to a particular geographic location, a particular road map, a particular feature map, particular image data associated with an image of a geographic location, particular image data associated with an image of a road map, particular image data associated with an image of a feature map, and/or the like. Additionally, or alternatively, the lane classification prediction model is specific to a particular user (e.g., an operator of an autonomous vehicle, an entity that operates an autonomous vehicle, etc.). In some implementations, lane classification system 102 generates one or more lane classification prediction models for one or more operators of one or more autonomous vehicles (e.g., one or more autonomous vehicles 104), a particular group of autonomous vehicles, and/or the like.

Additionally, or alternatively, when analyzing the training data, lane classification system 102 identifies one or more image variables (e.g., one or more independent image variables) as predictor variables that are used to make a prediction (e.g., when analyzing the training data) of a lane classification of a lane of a road. In some non-limiting embodiments or aspects, values of the predictor variables are inputs to the model. For example, lane classification system 102 identifies a subset (e.g., a proper subset) of image variables as predictor variables that are used to accurately predict a lane classification of a lane of a road. In some implementations, the predictor variables include one or more of the image variables, as discussed above, that have a significant impact (e.g., an impact satisfying a threshold) on a probability of a lane classification of a lane of a road.

In some non-limiting embodiments or aspects, lane classification system 102 validates the model. For example, lane classification system 102 validates the model after lane classification system 102 generates the model. In some implementations, lane classification system 102 validates the model based on a portion of the training data to be used for validation. For example, lane classification system 102 partitions the training data into a first portion and a second portion, where the first portion is used to generate the model, as described above. In this example, the second portion of the training data (e.g., the validation data) is used to validate the model. In some non-limiting embodiments or aspects, the first portion of the training data is different from the second portion of the training data.

In some implementations, lane classification system 102 validates the model by providing validation data associated with an image of a road as input to the model, and determining, based on an output of the model, whether it is determined that a lane classification of a lane of the road in the image is correct or incorrect. In some implementations, lane classification system 102 validates the model based on a validation threshold (e.g., a threshold value of the validation data). For example, lane classification system 102 is configured to validate the model when a lane classification of a lane of a road is correctly predicted by the model (e.g., when the prediction model correctly predicts 50% of the validation data, when the prediction model correctly predicts 70% of the validation data, etc.) as having a lane classification that is correct.

In some implementations, if lane classification system 102 does not validate the model (e.g., when a percentage of validation data does not satisfy the validation threshold), then lane classification system 102 generates additional models.

In some non-limiting embodiments or aspects, once the model has been validated, lane classification system 102 further trains the model and/or creates new models based on receiving new training data. In some non-limiting embodiments or aspects, the new training data includes image data associated with an image of a road that is different from a previous image of the road.

In some non-limiting embodiments or aspects, lane classification system 102 generates a map (e.g., a road map, a feature map, an AV map, etc.) and/or map data associated with the map based on the prediction score of lane classification generated by lane classification system 102. For example, lane classification system 102 generates the map and/or map data associated with the map based on a prediction score of a lane classification generated using a machine learning technique. In some non-limiting embodiments or aspects, lane classification system 102 assigns a prediction score of a lane classification to an element of a matrix of an image of a map. For example, lane classification system 102 assigns the prediction score of a lane classification to one or more elements of the matrix of the image of the map based on determining the prediction score of a lane classification associated with the one or more elements.

In some embodiments or aspects, lane classification system 102 converts a prediction score of a lane classification associated with an element of a matrix of an image (e.g., an image of a map) to an assigned value (e.g., a label) of the lane classification by comparing the prediction score of the lane classification to a threshold value of a prediction score of the lane classification. For example, lane classification system 102 assigns a value (e.g., 1 or 0 associated with a lane classification) to the element based on the prediction score of the lane classification associated with the element satisfying the threshold value of the prediction score of the lane classification.

In some non-limiting embodiments or aspects, lane classification system 102 and/or autonomous vehicle 104 compares a prediction score of a lane classification associated with an element of a matrix of an image to a threshold value of a prediction score of a lane classification. In some non-limiting embodiments or aspects, lane classification system 102 and/or autonomous vehicle 104 determine that an element of the map includes a lane classification based on the prediction score of the element of the map satisfying the threshold value of the prediction score of a lane classification.

In some non-limiting embodiments or aspects, lane classification system 102 determines a lane classification of a lane of a road based on image data associated with an image of the road using a convolutional neural network model. By using a convolutional neural network model to determine a lane classification, lane classification system 102 conserves processing resources as compared to using other machine learning techniques, such as a decision tree model, since lane classification system 102 may be required to receive manual descriptions (e.g., manual designations) of aspects of the image of the road that are used as inputs to other machine learning techniques.

In some non-limiting embodiments or aspects, lane classification system 102 processes one or more images of one or more roads to produce one or more artificial neurons associated with one or more convolution layers of a convolutional neural network model. For example, lane classification system 102 processes the one or more images using a scanning window to produce one or more artificial neurons associated with one or more convolution layers (e.g., 1 convolution layer, 5 convolution layers, etc.) of a convolutional neural network model. In some non-limiting embodiments or aspects, the one or more convolution layers include a plurality of artificial neurons associated with artificial neuron data.

In some non-limiting embodiments or aspects, the one or more images includes a stack of a plurality of images. For example, the stack (e.g., a vertically oriented stack, a horizontally oriented stack, etc.) of the plurality of images may be arranged so that the elements of a matrix of each of the images are aligned (e.g., a location of a first element of a first image in a first matrix is the same as a location of a second element of a second image in a second matrix).

In some non-limiting embodiments or aspects, lane classification system 102 scans (e.g., scans simultaneously, scans contemporaneously, scans sequentially, scans in parallel, etc.) the one or more images with a filter associated with the one or more convolution layers to produce artificial neuron data associated with one or more artificial neurons of a convolution layer. For example, lane classification system 102 scans the one or more elements of the matrix of the one or more images with a filter and lane classification system 102 produces the artificial neuron data by combining one or more values (e.g., a weight, a bias term, a value of feature map data, etc.) associated with an element of the one or more elements with one or more values associated with another element of the one or more elements. In some non-limiting embodiments or aspects, the filter comprises a scanning window having a predetermined size (e.g., a kernel size, a size corresponding to size of a number of elements, 1 element by 1 element, 2 elements by 2 elements, etc.) that determines how many elements, the one or more values of which, are combined. In some non-limiting embodiments or aspects, the artificial neuron data corresponds to (e.g., corresponds in size to, corresponds based on an area encompassed by, correspond based on a location encompassed by, etc.) the predetermined size of the scanning window. For example, the artificial neuron data is produced based on combining a number of elements included in the scanning window and the number of elements included in the scanning window is based on the predetermined size of the scanning window.

In some non-limiting embodiments or aspects, lane classification system 102 scans (e.g., scans simultaneously, scans contemporaneously, scans sequentially, scans in parallel, etc.) a stack of a plurality of images. For example, lane classification system 102 scans an element of a matrix of a first image of the plurality of images in the stack and lane classification system 102 scans an element of a matrix of a second image of the plurality of images in the stack that is aligned with the element of the matrix of the first image. In some non-limiting embodiments or aspects, lane classification system 102 scans (e.g., scans simultaneously, scans contemporaneously, scans sequentially, scans in parallel, etc.) the stack of the plurality of images. For example, lane classification system 102 scans each image of the stack of images in three dimensions.

In some non-limiting embodiments or aspects, lane classification system 102 processes artificial neuron data associated with the one or more convolution layers to produce one or more pooling neurons associated with one or more pooling layers of the convolutional neural network model. For example, lane classification system 102 processes artificial neuron data associated with one or more convolution layers of the convolutional neural network to produce one or more pooling neurons associated with one or more pooling layers (e.g., 1 pooling layer, 2 pooling layers, etc.) of the convolutional neural network.

In some non-limiting embodiments or aspects, lane classification system 102 scans (e.g., subsamples, scans simultaneously, scans contemporaneously, scans sequentially, scans in parallel, etc.) the one or more convolution layers with a filter associated with the one or more pooling layers to produce pooling neuron data associated with one or more pooling neurons of a pooling layer. For example, lane classification system 102 scans (e.g., scans simultaneously, scans contemporaneously, scans sequentially, scans in parallel, etc.) the one or more convolution layers with a filter and lane classification system 102 produces the pooling neuron data by aggregating (e.g., averaging, determining a maximum, determining a mean, etc.) a plurality of values associated with a plurality of artificial neurons of the one or more convolution layers. In some non-limiting embodiments or aspects, lane classification system 102 determines a maximum value of the values associated with the plurality of artificial neurons and discards all other values that are not the maximum value. In some non-limiting embodiments or aspects, the filter includes a scanning window having a predetermined size (e.g., a kernel size, a size corresponding to size of a number of elements, 1 element by 1 element, 2 elements by 2 elements, etc.) that determines how many artificial neurons, the values of which, are aggregated.

In some non-limiting embodiments or aspects, lane classification system 102 processes the pooling neuron data associated with the one or more pooling neurons of the one or more pooling layers with one or more deconvolution layers (e.g., one or more transposed convolution layers, one or more reverse convolution layers, etc.) of the convolutional neural network model to produce one or more prediction scores. For example, lane classification system 102 processes the pooling neuron data associated with the one or more pooling neurons of the one or more pooling layers with one or more deconvolution layers of the convolutional neural network model to produce one or more prediction scores.

In some non-limiting embodiments or aspects, lane classification system 102 upsamples (e.g., transposes, interpolates, etc.) the one or more pooling neurons and lane classification system 102 produces an image (e.g., an output image, a feature map, a road map, an image associated with an AV map, a geographic location image, etc.) that includes one or more lane classifications associated with one or more elements (e.g., an area made up of one or more elements) of a matrix of the image. For example, lane classification system 102 uses a filter associated with the one or more deconvolution layers to upsample (e.g., transpose, interpolate, etc.) the pooling neuron data associated with one or more pooling neurons to produce the image. In some non-limiting embodiments or aspects, the filter includes a scanning window having a predetermined size (e.g., a kernel size, a size corresponding to size of a number of elements, etc.) that determines how many elements (e.g., how many elements in an output) are produced using the filter. In some non-limiting embodiments or aspects, the filter associated with the one or more deconvolution layers is the same or similar as a filter associated with one or more convolution layers.

Further details regarding non-limiting embodiments or aspects of step 404 of process 400 are provided below with regard to FIG. 5.

As further shown in FIG. 4, at step 406, process 400 includes providing lane classification data associated with the lane classification of the lane of the road. For example, lane classification system 102 provides the lane classification data associated with the lane classification of the lane of the road based on determining the lane classification of the lane.

In some non-limiting embodiments or aspects, lane classification system 102 generates a map (e.g., a road map, an AV map, a feature map, etc.) based on lane classification data associated with a lane classification of a lane of a road. For example, lane classification system 102 generates a map based on the lane classification data and the map includes the lane classification of the lane of the road. In some non-limiting embodiments or aspects, lane classification system 102 generates a map based on the lane classification data associated with a lane classification of a lane and the map includes additional image data associated with the map. For example, lane classification system 102 generates a new map, updates a previous map, and/or the like based on the lane classification data associated with the lane classification. In some non-limiting embodiments or aspects, lane classification system 102 may generate a map so that the map includes a label associated with a lane classification of a lane of a road in the map. For example, lane classification system 102 may determine whether each element of a matrix of an image of the map includes a prediction score indicating that element is associated with a lane classification. Lane classification system 102 labels or does not label the one or more elements of the matrix with the lane classification based on determining that the one or more elements include or do not include a prediction score of the lane classification indicating that the one or more elements are associated with the lane classification.

In some non-limiting embodiments or aspects, lane classification system 102 provides image data (e.g., road map data, AV map data, feature map data, etc.) associated with an image that was used to generate the predictions score after generating the prediction scores. In some non-limiting embodiments or aspects, lane classification system 102 determines (e.g., generates) a prediction score of a lane classification associated with each element of a matrix of the image. For example, lane classification system 102 determines a prediction score of a lane classification associated with each element of a matrix of an image of a feature map, a road map, an AV map, and/or a geographic location. In some non-limiting embodiments or aspects, lane classification system 102 generates an image that includes the prediction score of each element of the matrix of the image. For example, lane classification system 102 generates an image of feature map, a road map, an AV map, and/or a geographic location that includes the prediction score of a lane classification associated with each element of the matrix of the image of a road map, the image of a geographic location, a feature map, and/or an AV map.

In some non-limiting embodiments or aspects, lane classification system 102 may generate a map (e.g., a road map, an AV map, a feature map, etc.) based on a lane classification and/or a prediction score of a lane classification. For example, lane classification system 102 generates a road map, an AV map, and/or a feature map that includes the lane classification and/or the prediction score of the lane classification associated with each element of a matrix of an image of the map (e.g., the road map, the AV map, the feature map, etc.). In some non-limiting embodiments or aspects, lane classification system 102 generates a map based on the lane classification and/or the prediction score of the lane classification and the map includes additional data associated with the lane classification and/or the prediction score of the lane classification. For example, lane classification system 102 generates a new map and/or an updated map and the new map and/or the updated map include data associated the lane classification and/or the prediction score of the lane classification that was determined based on generating the new map and/or the updated map. In some non-limiting embodiments or aspects, lane classification system 102 may generate the map so that the map includes a label associated with a lane classification. For example, lane classification system 102 may determine whether one or more portions of the map is associated with a lane classification. Lane classification system 102 determines to include or not to include a label of the lane classification on a portion of the map based on determining that a lane of a road in the portion of the map is or is not associated with the lane classification.

In some non-limiting embodiments or aspects, lane classification system 102 may generate the map so that the map includes a label associated with a lane marking. For example, lane classification system 102 may generate the map so that the map includes a label associated a lane in a merge area of a road, a fork in a road, an intersection, a branch, a junction a junction between at least three roads (e.g., a three-way intersection having a junction between three roads (e.g., road segments, etc.), a T junction when two roads form one road, a Y junction if approached from the stem of the Y, a four way intersection, a five way intersection, a six way intersection, etc.).

In some non-limiting embodiments or aspects, lane classification system 102 provides a map and/or map data associated with a map. For example, lane classification system 102 provides the map and/or the map data associated with the map to autonomous vehicle 104. In some non-limiting embodiments or aspects, lane classification system 102 provides the map and/or the map data associated with the map to autonomous vehicle 104 based on generating the map. In some non-limiting embodiments or aspects, lane classification system 102 provides the map and/or the map data based on determining a lane classification of a lane of a road in the map.

In some non-limiting embodiments or aspects, lane classification system 102 generates the map and lane classification system 102 processes the map using a binary classifier. For example, lane classification system 102 generates the map that includes one or more prediction scores of a lane classification associated with one or more portions of the map (e.g., one or more portions of the map that include a lane of a road). Lane classification system 102 processes the map so that the one or more portions of the map include one or more labels of the lane classification. In some non-limiting embodiments or aspects, lane classification system 102 uses a threshold value of a prediction score of a lane classification associated with the binary classifier to determine whether the one or more portions of the map include the one or more labels of the lane classification. For example, lane classification system 102 compares the one or more prediction scores of a lane classification associated with the one or more portions of the map to the threshold value of a prediction score of the lane classification. If lane classification system 102 determines that the one or more prediction scores of the lane classification associated with the one or more portions satisfy or do not satisfy the threshold value, lane classification system 102 includes a label or does not include the label of the lane classification associated with the one or more portions in the map.

In some non-limiting embodiments or aspects, lane classification system 102 and/or autonomous vehicle 104 determines whether a lane of a road is available to be traveled on by autonomous vehicle 104 during operation of autonomous vehicle 104. For example, lane classification system 102 and/or autonomous vehicle 104 determines that a lane of a road is available to be traveled on by autonomous vehicle 104 or is not available to be traveled on by autonomous vehicle 104 based on a lane classification of the lane.

In some non-limiting embodiments or aspects, lane classification system 102 provides a map and/or map data associated with the map generated based on a lane classification (e.g., a lane classification of a lane of a road in the map) to autonomous vehicle 104 and autonomous vehicle 104 travels (e.g., navigate, travels on a route, navigates a route, etc.) based on the map and/or the map data associated with the map. For example, lane classification system 102 provides a map (e.g., a map associated with a geographic location in which autonomous vehicle 104 operates) to autonomous vehicle 104 and autonomous vehicle 104 receives the map. Autonomous vehicle 104 performs vehicle control actions (e.g., braking, steering, accelerating) while traveling based on the map. In some non-limiting embodiments or aspects, autonomous vehicle 104 plans a route based on a lane classification of a lane of a road in the map.

Figure 5:
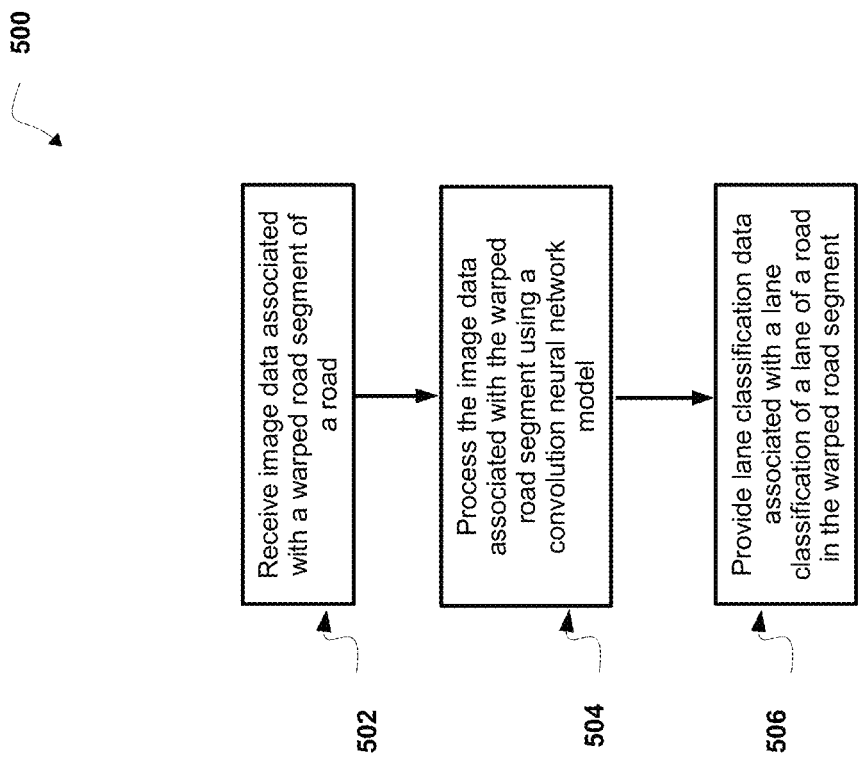
FIG. 5 is a flowchart of a non-limiting embodiment or aspect of a process for automatically classifying a lane of a road based on image data.

Referring now to FIG. 5, FIG. 5 is a flowchart of a non-limiting embodiment or aspect of a process 500 for automatically classifying a lane of a road based on image data. In some non-limiting embodiments or aspects, one or more of the steps of process 500 can be performed (e.g., completely, partially, etc.) by lane classification system 102 (e.g., one or more devices of lane classification system 102). In some non-limiting embodiments or aspects, one or more of the steps of process 500 can be performed (e.g., completely, partially, etc.) by another device or a group of devices separate from or including lane classification system 102, such as autonomous vehicle 104 (e.g., one or more devices of autonomous vehicle 104).

As shown in FIG. 5, at step 502, process 500 includes receiving image data associated with a warped road segment of a road. For example, lane classification system 102 receives image data associated with a warped road segment of a road. In some non-limiting embodiments or aspects, lane classification system 102 generates a warped road segment of a road. For example, lane classification system 102 generates the warped road segment of the road in the same or similar way as described above with regard to process 400. In such an example, lane classification system 102 generates the warped road segment associated with the one or more roads from the image data associated with the image of the one or more roads. In some non-limiting embodiments or aspects, lane classification system 102 receives image data associated with a warped road segment of a road based on generating the warped road segment of the road.

As shown in FIG. 5, at step 504, process 500 includes processing the image data associated with the warped road segment using a convolutional neural network. For example, lane classification system 102 processes the image data associated with the warped road segment using a convolutional neural network to generate a lane classification of a lane of a road in the warped road segment. In some non-limiting embodiments or aspects, lane classification system 102 processes the image data using a machine learning algorithm. For example, lane classification system 102 processes the image data using a convolutional neural network in the same or similar way as described above with regard to process 400. In such an example, lane classification system provides warped road segment image data associated with the warped road segment to a machine learning algorithm as an input to a machine learning algorithm.

As shown in FIG. 5, at step 506, process 500 includes providing lane classification data associated with a lane classification of a lane of a road in the warped road segment. For example, lane classification system 102 provides lane classification data associated with a lane classification of a lane of a road in the warped road segment. In some non-limiting embodiments or aspects, lane classification system 102 provides lane classification data associated with the lane classification of the lane of the road in the same or similar way as described above with regard to process 400. In some non-limiting embodiments or aspects, lane classification system 102 receives the lane classification of the one or more lanes from a machine learning algorithm where the machine learning algorithm was used to determine the lane classification based on the warped road segment image data associated with the warped road segment. For example, lane classification system 102 receives the lane classification of the one or more lanes from as an output of the machine learning algorithm.

Figure 6A:
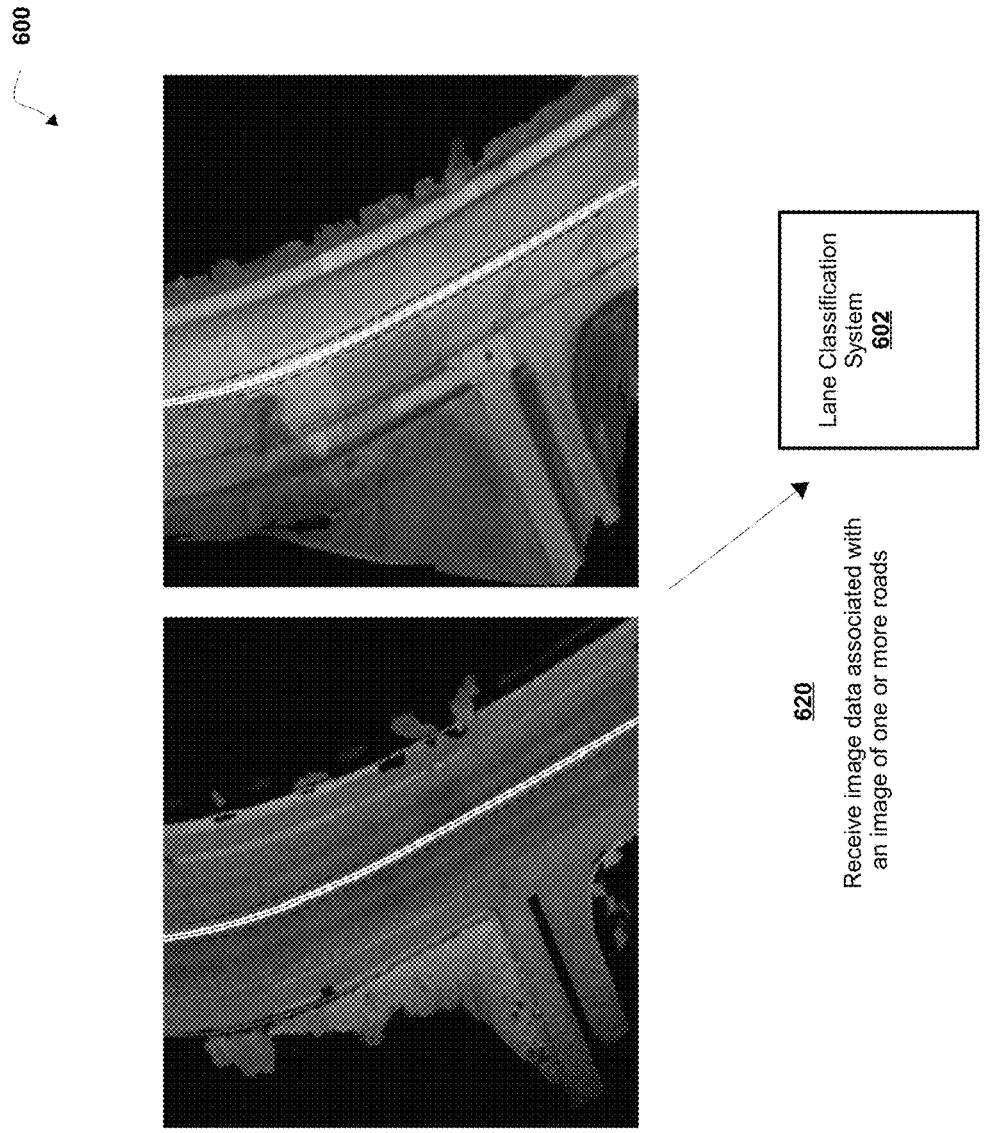
FIGS. 6A-6C are diagrams of an implementation of a non-limiting embodiment or aspect of a process disclosed herein.
Figure 6B:
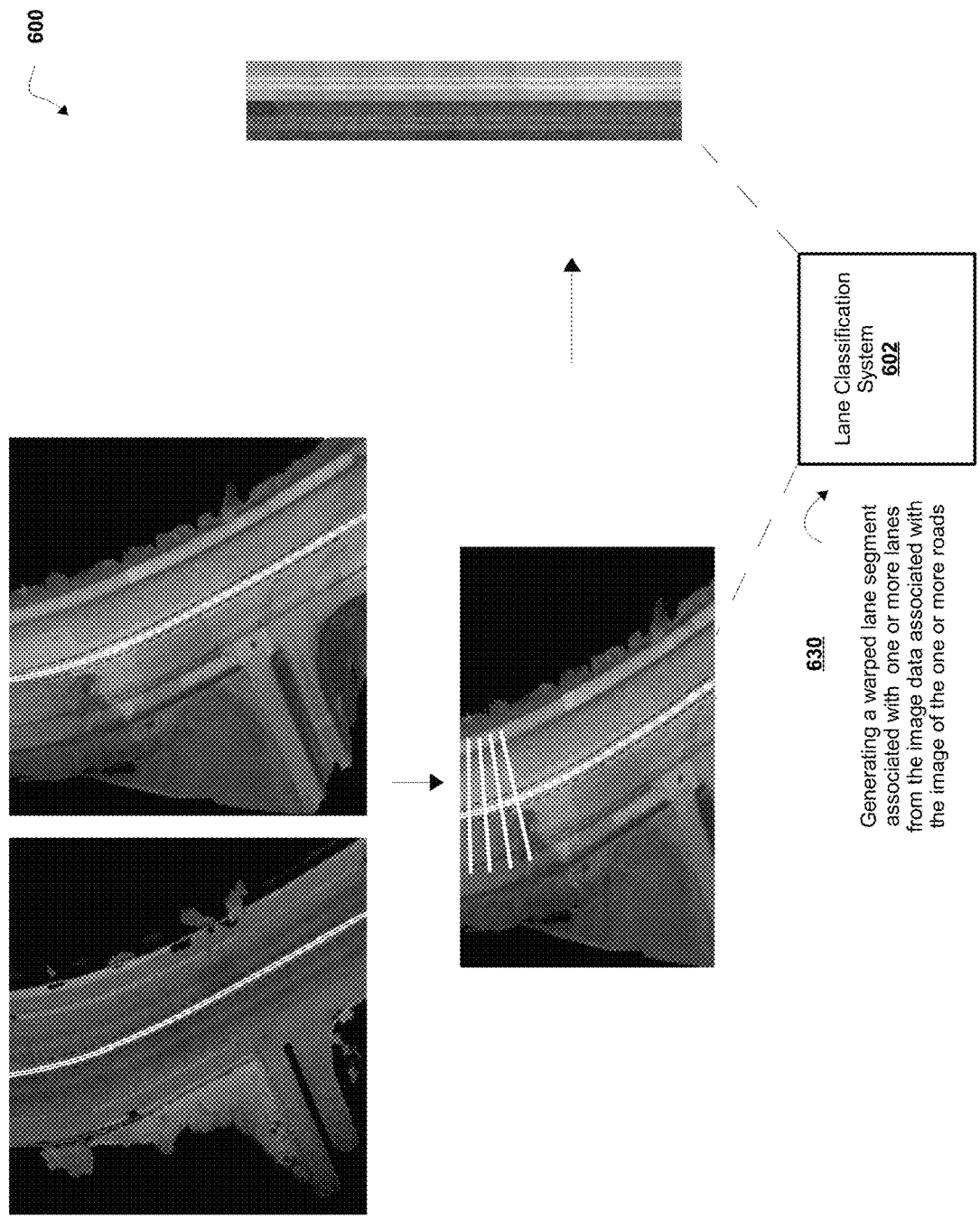
Figure 6C:
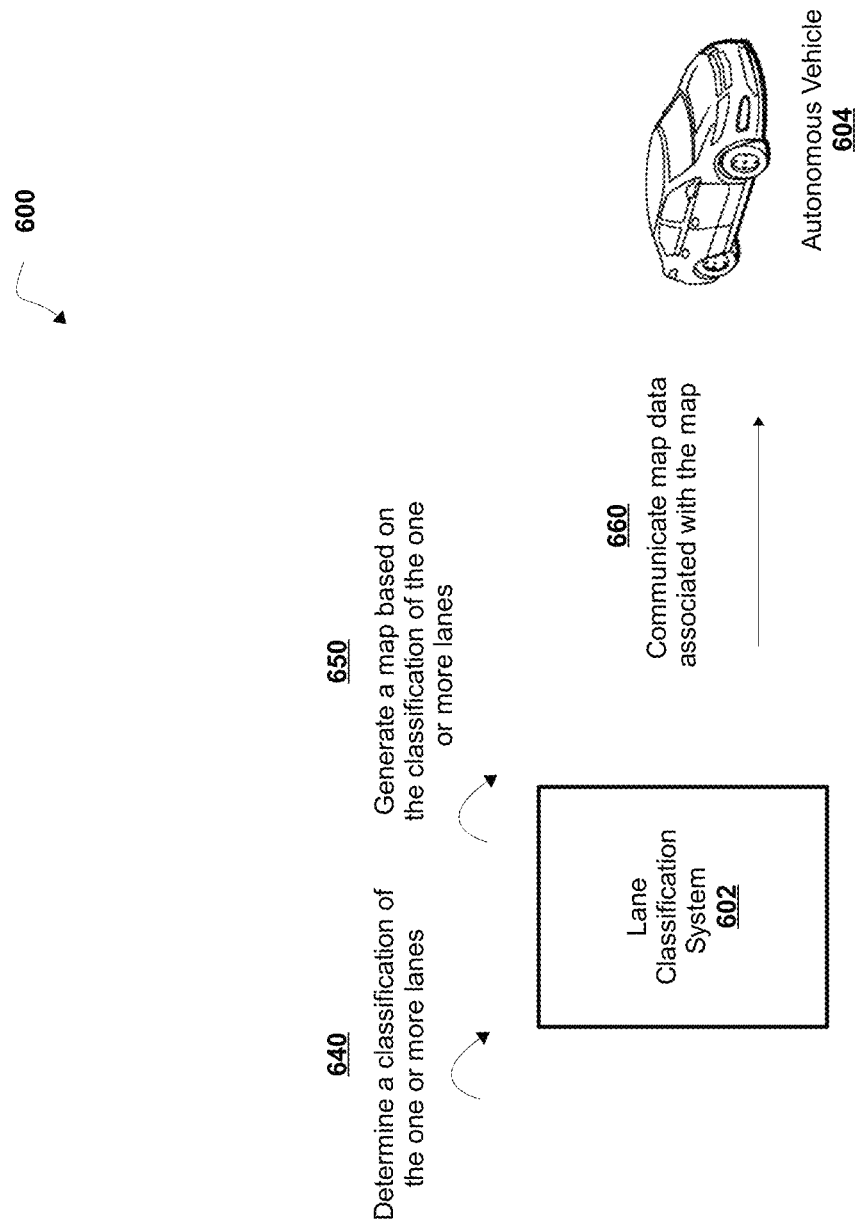

Referring now to FIGS. 6A-6C, FIGS. 6A-6C are diagrams of an overview of a non-limiting embodiment or aspect of an implementation 600 relating to a process for automatically classifying a lane of a road based on image data. As shown in FIGS. 6A-6C, implementation 600 includes lane classification system 602 and autonomous vehicle 604. In some non-limiting embodiments or aspects, lane classification system 602 can be the same or similar to lane classification system 102. In some non-limiting embodiments or aspects, autonomous vehicle 604 can be the same or similar to autonomous vehicle 104.

As shown by reference number 620 in FIG. 6A, lane classification system 602 receives image data associated with an image of a road. For example, lane classification system 602 receives image data associated with an image of a road including LIDAR image data associated with a LIDAR image of the road and an RGB image data associated with a top down RGB image of the road.

As further shown by reference number 620 in FIG. 6A, the image data is associated with an image of a road and the road includes a lane of the road. For example, the image data includes image data associated with an image of a geographic location including one or more roads and one or more lanes of a road. The image data includes a lane marking associated with an indication of a lane attribute of a lane. For example, the lane marking is associated with an indication of a travel lane including a plurality of solid lines on a road (e.g., a plurality of solid lines adjacent each other on a road), the plurality of solid lines including one or more white lines (e.g., a double solid line).

As shown by reference number 630 in FIG. 6B, lane classification system 602 generates a warped road segment associated with the road based on the image data associated with the image of the road. For example, lane classification system 602 receives the image data associated with the image of the road that includes a lane and the road and/or the lane has an orientation that is not straight (e.g., the road and/or the lane is curved). Lane classification system 602 determines a line that is normal (e.g., perpendicular) to the road and/or the lane at one or more points along a curve of the road and/or the lane. Lane classification system 602 scans image data associated with the line from the image of the road. Lane classification system 102 arranges the image data associated with the line for each point of the one or more points along the curve of the road and/or the lane in a straight orientation to generate the warped road segment.

As shown by reference number 640 in FIG. 6C, lane classification system 602 determines a lane classification of the lane of the road based on the warped road segment associated with the road. For example, lane classification system 602 determines the lane classification (e.g., NO_LANE, SINGLE_SOLID, DOUBLE_SOLID, DOTTED, DASHED, etc.) of the lane of the road in the warped road segment using a convolutional neural network model. As further shown by reference number 650 in FIG. 6C, lane classification system 602 generates a map (e.g., an AV map) based on the lane classification (e.g., DOUBLE SOLID, etc.) of the lane of the road.

As further shown by reference number 660 in FIG. 6C, lane classification system 602 provides map data associated with the map to autonomous vehicle 604. In some non-limiting embodiments or aspects, autonomous vehicle 604 may travel in a lane of a road in the map based on the map data (e.g., map data that includes lane classification data associated with a lane) associated with the map. For example, autonomous vehicle 604 may travel in a lane of a road in the map based on the lane classification data associated with the lane classification of the lane of the road in the warped road segment where the road in the warped road segment is in the map.

The foregoing disclosure provides illustration and description, but is not intended to be exhaustive or to limit the implementations to the precise form disclosed. Modifications and variations are possible in light of the above disclosure or can be acquired from practice of the implementations.

Some implementations are described herein in connection with thresholds. As used herein, satisfying a threshold refers to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more" and/or "at least one". Furthermore, as used herein, the term "set" is intended to include one or more items (e.g., related items, unrelated items, a combination of related and unrelated items, etc.), and can be used interchangeably with "one or more" and/or "at least one." Where only one item is intended, the term "one" or similar language is used. Also, as used herein, the terms "has," "have," "having," and/or the like are intended to be open-ended terms. Further, the phrase "based on" is intended to mean "based, at least in part, on," "in response to," and/or the like, unless explicitly stated otherwise.

What is claimed is:

1. A method comprising:
   receiving, with a computer system comprising one or more processors, image data associated with an image of a road, wherein the road comprises one or more lanes;
   determining that the image data depicts a portion of the road comprising a curve;
   determining a first line in the image data, the first line being perpendicular to the road at a first position on the curve;
   determining a second line in the image data, the second line being perpendicular to the road at a second position on the curve, first position being different than the second position;
   arranging a first portion of the image data along the first line and a second portion of the image data along the second line to generate warped road segment image data depicting a warped road segment;
   determining, with the computer system, a lane classification of the one or more lanes based on the image data associated with the image of the road and the warped road segment image data; and
   providing, with the computer system, lane classification data associated with the lane classification to an autonomous vehicle (AV) for controlling travel of the AV in the one or more lanes.

2. The method of claim 1, further comprising:
   providing the image data associated with the image of the road to a convolutional neural network; and
   processing the image data associated with the image of the road by the convolutional neural network, the lane classification of the one or more lanes being based at least in part on the processing of the image data by the convolutional neural network.

3. The method of claim 1, wherein determining the lane classification of the one or more lanes comprises:
   determining one or more lane markings associated with the one or more lanes of the road based on the image data associated with the image of the road; and
   determining, with the computer system, a lane classification of the one or more lanes based on the one or more lane markings associated with the one or more lanes.

4. The method of claim 3, further comprising determining one or more lane attributes associated with the one or more lanes of the road based on the one or more lane markings associated with the one or more lanes of the road, the determining of the lane classification of the one or more lanes being based at least in part on the one or more lane attributes associated with the one or more lanes of the road.

5. The method of claim 1, wherein the lane classification of the one or more lanes comprises an indication of a lane marking of the one or more lanes.

6. The method of claim 5, wherein the lane marking comprises at least one of:
   one or more lines,
   one or more letters,
   one or more symbols, or
   any combination thereof.

7. The method of claim 1, further comprising:
   providing the warped road segment image data as an input to a machine learning algorithm; and
   receiving the lane classification of the one or more lanes based on the warped road segment image data associated with the warped road segment.

8. A computing system comprising:
   one or more processors programmed or configured to:
      receive image data associated with an image of a road, wherein the road comprise one or more lanes;

determine that the image data depicts a portion of the road comprising a curve;

determine a first line in the image data, the first line being perpendicular to the road at a first position on the curve;

determine a second line in the image data, the second line being perpendicular to the road at a second position on the curve, first position being different than the second position;

arrange a first portion of the image data along the first line and a second portion of the image data along the second line to generate warped road segment image data depicting a warped road segment;

determine a lane classification of the one or more lanes based on the image data associated with the image of the road and the warped road segment image data; and provide lane classification data associated with the lane classification of the one or more lanes to an autonomous vehicle (AV) for controlling travel of the AV in the one or more lanes.

9. The computing system of claim 8, wherein the one or more processors are further programmed or configured to:
provide the image data associated with the image of the road to a convolutional neural network;
wherein the one or more processors, when determining a lane classification of the one or more lanes are further programmed or configured to: process the image data associated with the image of the road by the convolutional neural network; and
the one or more processors are further programmed or configured to: receive the lane classification of the one or more lanes of the road from the convolutional neural network based on processing the image data associated with the image of the road.

10. The computing system of claim 8, wherein the one or more processors are further programmed or configured to:
determine one or more lane markings associated with the one or more lanes of the road based on the image data associated with the image of the road; and
determine a lane classification of the one or more lanes based on the one or more lane markings associated with the one or more lanes.

11. The computing system of claim 10, wherein the one or more processors are further programmed or configured to:
determine one or more lane attributes associated with the one or more lanes of the road based on the one or more lane markings associated with the one or more lanes of the road; and
wherein the one or more processors, when determining the lane classification of the one or more lanes, are programmed or configured to:
determine the lane classification of the one or more lanes based on the one or more lane attributes associated with the one or more lanes of the road.

12. The computing system of claim 8, wherein the lane classification of the one or more lanes comprises an indication of a lane marking of the one or more lanes.

13. The computing system of claim 12, wherein the lane marking comprises at least one of:
one or more lines,
one or more letters,
one or more symbols, or
any combination thereof.

14. The computing system of claim 8, wherein the one or more processors are further programmed or configured to:
provide the warped road segment image data as an input to a machine learning algorithm; and
receive the lane classification of the one or more lanes based on the warped road segment image data associated with the warped road segment.

15. An autonomous vehicle (AV) comprising:
one or more sensors for detecting an object in an environment surrounding the autonomous vehicle; and
a vehicle computing system comprising one or more processors, wherein the vehicle computing system is programmed or configured to:
receive AV map data associated with an AV map including a road, the AV map including one or more prediction scores associated with one or more areas of the AV map, wherein the AV map data is determined based on:
receiving image data associated with an image of the road, wherein the road comprises one or more lanes;
determining that the image data depicts a portion of the road comprising a curve;
determining a first line in the image data, the first line being perpendicular to the road at a first position on the curve;
determining a second line in the image data, the second line being perpendicular to the road at a second position on the curve, first position being different than the second position;
arranging a first portion of the image data along the first line and a second portion of the image data along the second line to generate warped road segment image data depicting a warped road segment;
determining a lane classification of the one or more lanes based on the image data associated with the image of the road and the warped road segment image data;
providing lane classification data associated with the lane classification of the one or more lanes; and
control travel of the autonomous vehicle based on sensor data from the one or more sensors and the AV map data associated with the AV map.

16. The autonomous vehicle of claim 15, wherein the vehicle computing system is further programmed or configured to:
control the autonomous vehicle to travel with respect to the lane classification based on determining that the one or more areas of the AV map comprise a lane marking of the one or more lanes.

17. The autonomous vehicle of claim 15, wherein the lane classification of the one or more lanes comprises an indication of a lane marking of the one or more lanes.

18. The autonomous vehicle of claim 17, wherein the lane marking comprises at least one of:
one or more lines,
one or more letters,
one or more symbols, or
any combination thereof.

19. The autonomous vehicle of claim 15, wherein the AV map data is determined based on:
providing the image data associated with the image of the road to a convolutional neural network;
processing the image data associated with the image of the road by the convolutional neural network; and receiving the lane classification of the one or more lanes of the road from the convolutional neural network based on processing the image data associated with the image of the road.

20. The autonomous vehicle of claim 15, wherein the AV map data is determined based on:
  determining one or more lane markings associated with the one or more lanes of the road based on the image data associated with the image of the road; and
  determining the lane classification of the one or more lanes based on the one or more lane markings associated with the one or more lanes.

\* \* \* \* \*